(12) United States Patent
Paredes Cabrera et al.

(10) Patent No.: US 10,959,171 B2
(45) Date of Patent: Mar. 23, 2021

(54) CELL SELECTION BY SERVICE GROUP

(71) Applicant: Telefonaktiebolaget LM Ericsson (publ), Stockholm (SE)

(72) Inventors: Ricardo Paredes Cabrera, Ottawa (CA); Jianning Liu, Ottawa (CA); Vijayashree Sundaram, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/620,931

(22) PCT Filed: Jul. 31, 2017

(86) PCT No.: PCT/IB2017/054677
§ 371 (c)(1),
(2) Date: Dec. 10, 2019

(87) PCT Pub. No.: WO2019/025831
PCT Pub. Date: Feb. 7, 2019

(65) Prior Publication Data
US 2020/0205068 A1 Jun. 25, 2020

(51) Int. Cl.
H04W 4/00 (2018.01)
H04W 48/20 (2009.01)
H04W 76/10 (2018.01)
H04W 48/16 (2009.01)

(52) U.S. Cl.
CPC ........... *H04W 48/20* (2013.01); *H04W 48/16* (2013.01); *H04W 76/10* (2018.02)

(58) Field of Classification Search
CPC ...... H04W 48/20; H04W 76/10; H04W 48/16

USPC .......................................... 455/434; 370/338
See application file for complete search history.

(56) References Cited

U.S. PATENT DOCUMENTS

| | | | |
|---|---|---|---|
| 9,066,273 | B2 | 6/2015 | Jain et al. |
| 9,426,697 | B2 | 8/2016 | Burbidge et al. |
| 9,444,679 | B2 | 9/2016 | Cabrera et al. |
| 9,451,652 | B2 | 9/2016 | Gohari et al. |
| 9,467,822 | B2 | 10/2016 | Li et al. |

(Continued)

FOREIGN PATENT DOCUMENTS

WO 2016046698 A1 3/2016

OTHER PUBLICATIONS

Author Unknown, "Technical Specification Group Radio Access Network; Evolved Universal Terrestrial Radio Access (E-UTRA); Physical layer procedures (Release 14)," Technical Specification 36.213, Version 14.3.0, 3GPP Organizational Partners, Jun. 2017, 460 pages.

(Continued)

*Primary Examiner* — Marcos Batista
(74) *Attorney, Agent, or Firm* — Withrow & Terranova, PLLC

(57) ABSTRACT

Cell selection by a service group is disclosed. A user equipment (UE) determines that a first cellular service of a plurality of cellular services is desired. The UE accesses service group information that correlates a plurality of service groups to a plurality of cells, wherein each service group is associated with one or more cellular services. The UE initiates a first connection with a first cell of the plurality of cells that can provide the first cellular service based at least in part on the service group information.

19 Claims, 23 Drawing Sheets

(56) References Cited

U.S. PATENT DOCUMENTS

| | | | |
|---|---|---|---|
| 9,504,015 B2 | 11/2016 | Lee et al. | |
| 2008/0045224 A1* | 2/2008 | Lu | H04W 72/005 455/446 |
| 2013/0303088 A1* | 11/2013 | Watfa | H04W 4/029 455/41.2 |
| 2014/0056230 A1 | 2/2014 | Dimou | |
| 2014/0355493 A1 | 12/2014 | Niu et al. | |
| 2015/0004969 A1 | 1/2015 | Han et al. | |
| 2015/0139076 A1 | 5/2015 | Keller et al. | |
| 2015/0223212 A1 | 8/2015 | Der Velde et al. | |
| 2016/0337939 A1 | 11/2016 | Mukherjee et al. | |
| 2017/0048053 A1 | 2/2017 | Kim et al. | |
| 2017/0064601 A1 | 3/2017 | Kubota et al. | |
| 2017/0064691 A1 | 3/2017 | Kubota et al. | |
| 2017/0086254 A1* | 3/2017 | Lee | H04L 5/0098 |

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," Technical Specification 36.300, Version 14.3.0, 3GPP Organizational Partners, Jun. 2017, 331 pages.

Author Unknown, "Technical Specification Group Radio Access Network; Evolved Universal Terrestrial Radio Access (E-UTRA); User Equipment (UE) procedures in idle mode (Release 14)," Technical Specification 36.304, Version 14.3.0, 3GPP Organizational Partners, Jun. 2017, 49 pages.

Author Unknown, "Technical Specification Group Radio Access Network; Evolved Universal Terrestrial Radio Access (E-UTRA); Medium Access Control (MAC) protocol specification (Release 14)," Technical Specification 36.321, Version 14.3.0, 3GPP Organizational Partners, Jun. 2017, 107 pages.

Author Unknown, "Technical Specification Group Radio Access Network; Evolved Universal Terrestrial Radio Access (E-UTRA); Radio Resource Control (RRC); Protocol specification (Release 14)," Technical Specification 36.331, Version 14.3.0, 3GPP Organizational Partners, Jun. 2017, 745 pages.

Author Unknown, "Technical Specification Group Radio Access Network; Evolved Universal Terrestrial Radio Access Network (E-UTRAN); S1 Application Protocol (S1AP) (Release 14)," Technical Specification 36.413, Version 14.3.0, 3GPP Organizational Partners, Jun. 2017, 347 pages.

Author Unknown, "Technical Specification Group Radio Access Network; Evolved Universal Terrestrial Radio Access Network (E-UTRAN); X2 application protocol (X2AP) (Release 14)," Technical Specification 36.423, Version 14.3.0, 3GPP Organizational Partners, Jun. 2017, 242 pages.

Invitation to Pay Additional Fees and Partial Search for International Patent Application No. PCT/IB2017/054677, dated Feb. 13, 2018, 14 pages.

International Search Report and Written Opinion for International Patent Application No. PCT/IB2017/054677, dated Apr. 6, 2018, 21 pages.

* cited by examiner

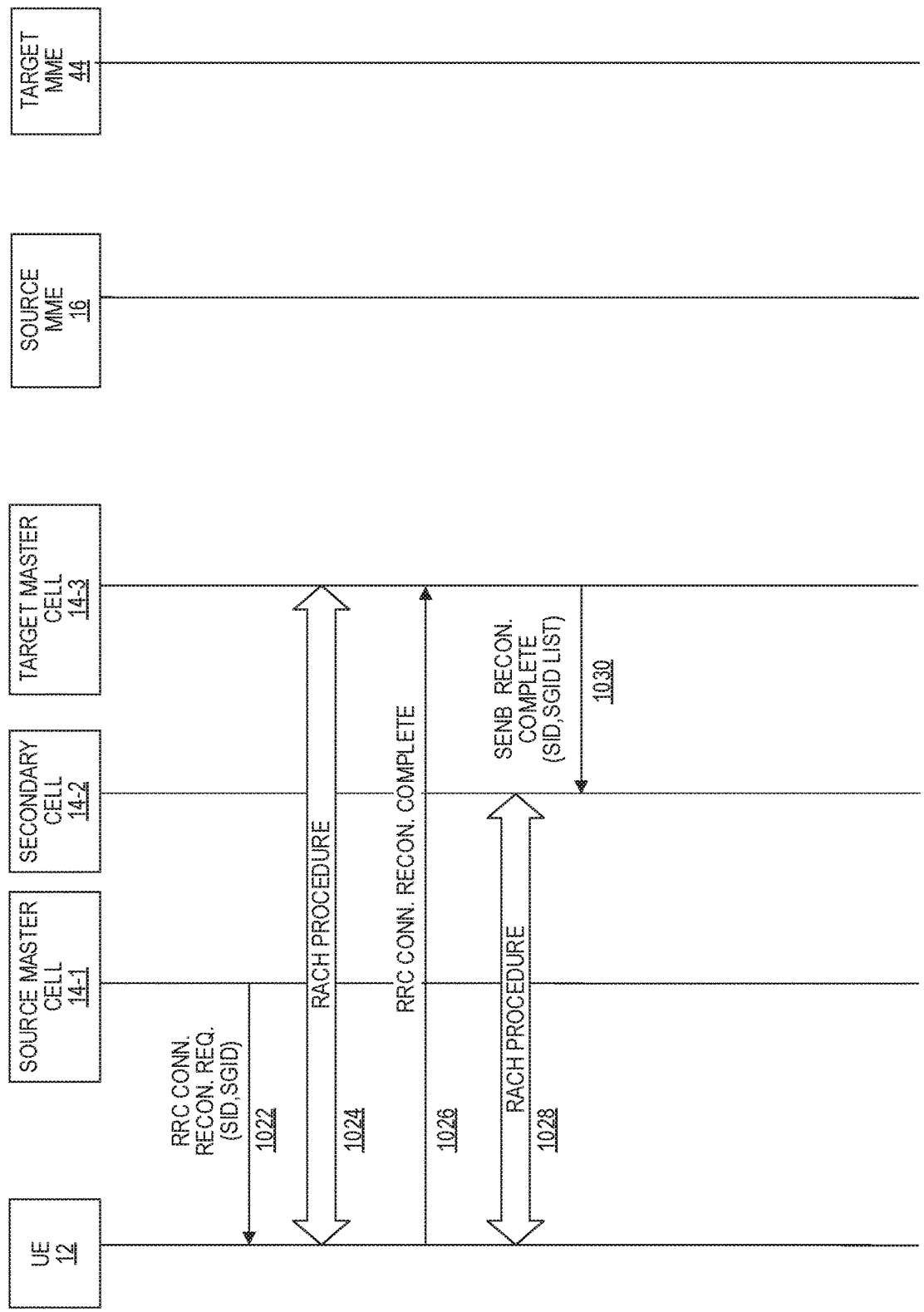

CELL SELECTION BY SERVICE GROUP

This application is a 35 U.S.C. § 371 national phase filing of International Application No. PCT/IB2017/054677, filed Jul. 31, 2017, the disclosure of which is incorporated herein by reference in its entirety.

TECHNICAL FIELD

The embodiments relate generally to cellular networks and, in particular, to cell selection based on service groups in a cellular network.

BACKGROUND

Many cellular technologies, such as those implemented in accordance with the $3^{rd}$ Generation Partnership Project (3GPP) standards, use a bearer (radio bearer or transport level) as the level of granularity in the Radio Access Network (RAN) to transport data between a user equipment and the network. Resource allocation algorithms, admission control, scheduling, load balancing, and the like are based on the bearer level of granularity, which ignores upper layer requirements at the end-to-end application/service type level, which include, for example, multiple Long Term Evolution (LTE) bearers. For example, a video service is treated as a single service at the application layer; however, an LTE network often breaks such video service into three or more independent radio and transport bearers (control bearer, sound bearer, and video bearer).

U.S. Pat. No. 9,444,679 discloses the grouping of bearers into sets which define a complete end-to-end service as understood by upper layers, such as application layers, in the communication protocols.

SUMMARY

The embodiments implement service groups in a cellular network to facilitate better distribution of cellular services among cells based on upper layer services, such as services implemented by an application layer, rather than via bearer channels, and also facilitate connection, by a user equipment (UE), to multiple different cells based on the cellular services required by the UE.

In one embodiment, a method is provided. The method includes determining, by a UE, that a first cellular service of a plurality of cellular services is desired. The method further includes accessing, by the UE, service group information that correlates a plurality of service groups to a plurality of cells, wherein each service group is associated with one or more cellular services, and initiating a first connection with a first cell of the plurality of cells that can provide the first cellular service based at least in part on the service group information.

In another embodiment, a UE is provided. The UE includes a network interface and a processor device coupled to the network interface. The processor device is configured to determine that a first cellular service of a plurality of cellular services is desired. The processor device is further configured to access service group information that correlates a plurality of service groups to a plurality of cells, wherein each service group is associated with one or more cellular services, and initiate a first connection with a first cell of the plurality of cells that can provide the first cellular service based at least in part on the service group information.

In another embodiment, another method is provided. The method includes broadcasting, by a first cell, supported service group information that identifies at least one service group supported by the first cell, and a cell identifier that identifies the first cell. The method further includes receiving, from a UE, a request to connect to the first cell, the request including a service group identifier of a service group supported by the first cell, and a service identifier that identifies a first service provided by the first cell, and connecting to the UE.

In another embodiment, a first cell is provided. The first cell includes a network interface and a processor device coupled to the network interface. The processor device is configured to broadcast supported service group information that identifies at least one service group supported by the first cell, and a cell identifier that identifies the first cell. The processor device is further configured to receive, from a UE, a request to connect to the first cell, the request including a service group identifier (ID) associated with the first cell, and a service identifier that identifies a service provided by the first cell, and connect to the UE.

In another embodiment, a UE is provided that includes a cellular service determination module configured to determine that a first cellular service of a plurality of cellular services is desired. The UE further includes an access module configured to access service group information that correlates a plurality of service groups to a plurality of cells, wherein each service group is associated with one or more cellular services, and a connection initiation module configured to initiate a connection with a first cell of the plurality of cells that can provide the first cellular service based at least in part on the service group information.

In another embodiment, a cell is provided. The cell includes a broadcast module configured to broadcast supported service group information that identifies at least one service group supported by the cell, and a cell identifier of the cell. The cell further includes a receiver module configured to receive, from a UE, a request to connect to the cell, the request including a service group identifier associated with the cell, and a service identifier that identifies a service provided by the cell. The cell further includes a connection module configured to connect to the UE.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 11A-11B are a message flow diagram illustrating the handover from one master cell to another master cell of the UE that is also connected to a secondary cell based on S1AP messaging, according to one embodiment;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The embodiments implement service groups in a cellular network to facilitate better distribution of cellular services among cells based on upper layer services, such as services implemented by an application layer, rather than via bearer channels, and also facilitate connection, by a user equipment (UE), to multiple different cells based on the cellular services required by the UE.

Figure 1:
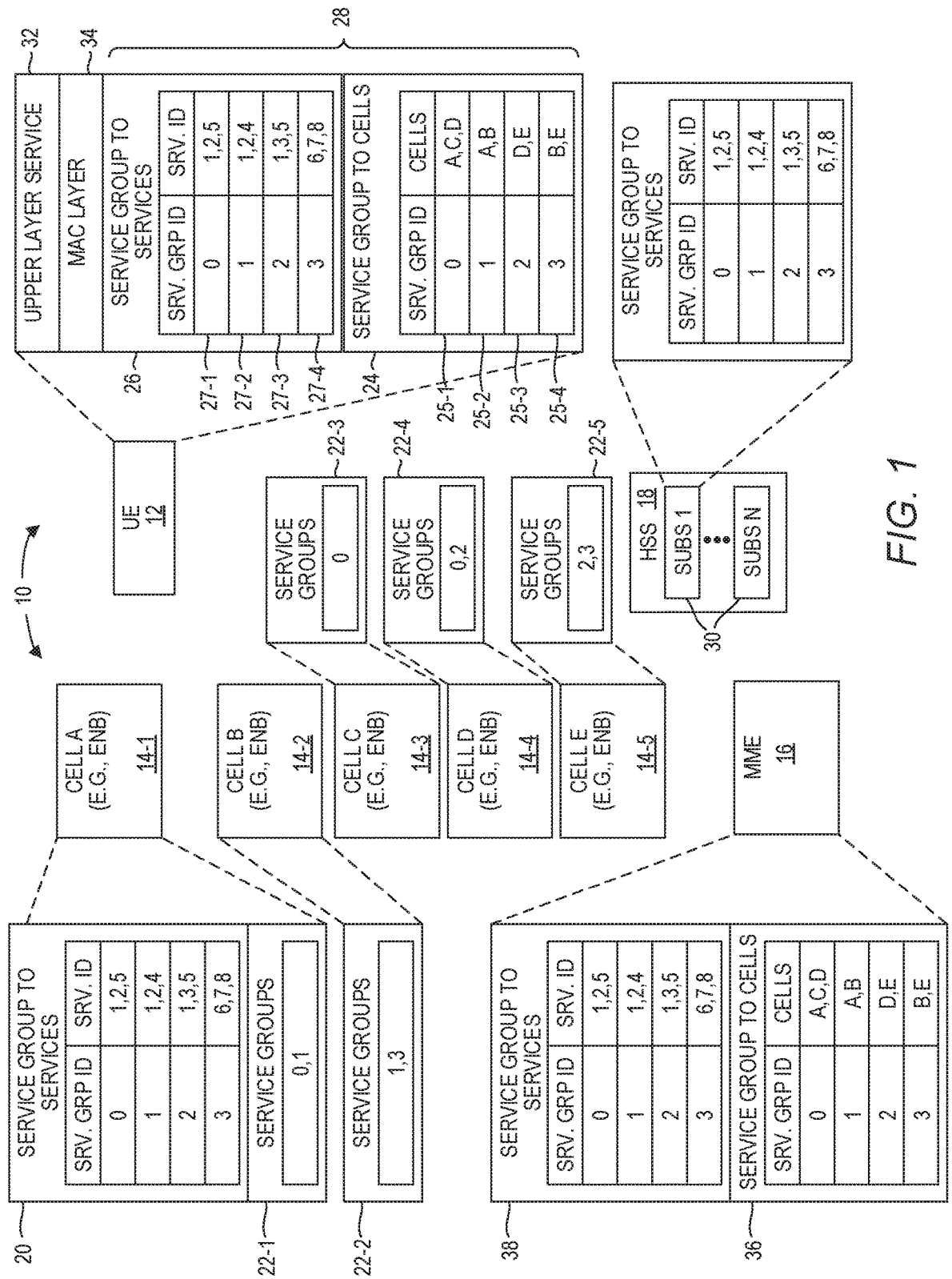
FIG. 1 is a block diagram of a cellular environment, according to one embodiment.

FIG. 1 is a block diagram of a cellular environment 10, according to one embodiment. While for purposes of illustration the embodiments are discussed in the context of a Long Term Evolution (LTE) 4G cellular environment, it will be appreciated that the embodiments have applicability in any cellular environment, including, by way of non-limiting example, the 5G New Radio cellular environment. The cellular environment 10 includes a UE 12, such as a mobile phone, mobile computing tablet, or the like. The cellular environment 10 also includes a plurality of cells 14-1-14-5 (generally, cells 14) that may be within wireless coverage of the UE 12. A cell 14 may be a base station, such as an enode-B (eNB), or may be one of multiple cells implemented by a single eNB. Each cell 14 includes an antenna, receive and transmit circuitry, and computing resources suitable for implementing the functionality disclosed herein. The cellular network also includes a Mobile Management Entity (MME) 16 and a home subscriber service (HSS) 18. It will be appreciated that the cellular environment 10, in operation, also includes other network nodes which are not illustrated in FIG. 1, such as a serving gateway (SGW) and a packet data network gateway (PGW).

Each cell 14 can support one or more service groups. Each service group is associated with one or more cellular services (sometimes referred to herein simply as "services" for the sake of brevity), such as, by way of non-limiting example, a voice over long term evolution (VoLTE) cellular service, an Internet Protocol Multimedia Subsystem (IMS) video cellular service, a voice over Internet Protocol (VoIP) best effort cellular service, and a video best effort cellular service that support a particular service, or set of services. Each cell 14 contains service group to services (SGTS) information 20 that correlates service group identifiers to service identifiers. Note that for purposes of space the SGTS information 20 is only shown in conjunction with the cell 14-1, but in practice each cell 14-2-14-5 may include the SGTS information 20. In one embodiment, the SGTS information 20 may be configured into the cells 14 by an operator of the cellular environment 10.

Table 1, below, is an example of the content of the SGTS information 20 according to one example.

TABLE 1

| Service Group ID | Description | Service ID |
|---|---|---|
| 0 | Default | {1 VOLTE Service, 2 IMS Video Service 5 Best effort data service . . .} |
| 1 | LTE | {1 VOLTE 2 IMS Video Service 4 CAT M service} |
| 2 | Broadband | {1 VOLTE 3 VOIP over Best Effort 5 Broadcast service} |
| 3 | Low latency | {6 CAT M service 7 Mission Critical broadcast service 8 Self driving car service} |
| 4 | NB IOT Services | . . . |
| 255 | | |
| . . . | | |
| 65535 | | |

Example Service Group to Service Information

Thus, each service group may be associated with one or more services, and each cell 14 may be associated with one or more service groups.

Each cell 14 also includes corresponding supported service group information 22-1-22-5 that identifies the service groups supported by the particular cell 14. Each cell 14 may broadcast, in a system information block (SIB) for example, the supported service group information 22 that identifies the service groups supported by that cell 14. The supported service group information 22 may also be configured into the cells 14 by a system operator.

In one embodiment, an SIB1 Information Element may be modified in the following manner to include the supported service group information 22 broadcasted by the cells 14:

```
SystemInformationBlockType1-BR-r13 ::=
    SystemInformationBlockType1
SystemInformationBlockType1 ::=         SEQUENCE {
    cellAccessRelatedInfo               SEQUENCE {
        plmn-IdentityList               PLMN-IdentityList,
        trackingAreaCode                TrackingAreaCode,
        cellIdentity                    CellIdentity,
        cellBarred                      ENUMERATED {barred,
                                                    notBarred},
        intraFreqReselection ENUMERATED {allowed, notAllowed},
        csg-Indication                              BOOLEAN,
        csg-Identity                    CSG-Identity OPTIONAL --
Need OR
servicegroup-IdentityList               Servicegroup-IdentityList
OPTIONAL
    },
```

The servicegroup-IdentityList element identifies the service groups supported by the respective cell 14. In a NarrowBand Internet of Things (NB-IoT) context, the SIB1 may be altered in the following manner to include the information 22:

```
-- ASN1START
SystemInformationBlockType1-NB ::=          SEQUENCE {
    hyperSFN-MSB-r13                BIT STRING (SIZE (8)),
    cellAccessRelatedInfo-r13                   SEQUENCE {
        plmn-IdentityList-r13 PLMN-IdentityList-NB-r13,
        trackingAreaCode-r13            TrackingAreaCode,
        cellIdentity-r13                CellIdentity,
        cellBarred-r13                  ENUMERATED {barred,
                                                    notBarred},
        intraFreqReselection-r13        ENUMERATED {allowed,
notAllowed}
servicegroup-IdentityList Servicegroup-IdentityList OPTIONAL ...
```

The UE 12 contains SGTC information 24 that the UE 12 may generate based on the SIB broadcasts that include the supported service group information 22 from each cell 14 within wireless range of the UE 12. The SGTC information 24 includes a plurality of rows 25-1-25-4 that identifies, for each service group, the cells 14 that support the service group. The UE 12 also contains SGTS information 26 that identifies the service group to service information for the particular UE 12. The SGTS information 26 includes a plurality of rows 27-1-27-4 that identifies, for each service group, the service IDs supported by that service group. The SGTC information 24 and the SGTS information 26 may be referred to collectively herein as service group information 28, which, generally, correlates a plurality of service groups to a plurality of cells 14, wherein each service group is associated with one or more cellular services. The SGTC information 24 in the UE 12 changes, over time, as the UE 12 leaves the wireless coverage area of some cells 14 and enters the wireless coverage area of other cells 14.

In one embodiment, the HSS 18 contains SGTS records 30 that identify, for each UE 12, the SGTS information 26 associated with the subscriber of the UE 12. The HSS 18 may communicate the corresponding SGTS record 30 to the UE 12 upon connection with the UE 12, and the UE 12 may store the SGTS record information as the SGTS information 26. In other embodiments, the SGTS information 26 may be configured into the UE 12 and maintained, for example, on a subscriber identity module (SIM) card or other non-volatile memory of the UE 12.

The UE 12 also supports one or more processes that run at an upper layer, or application layer, of the UE 12. Such processes may be one or more upper layer services 32, such as, by way of non-limiting example, a voice over long term evolution (VoLTE) cellular service, an Internet Protocol Multimedia Subsystem (IMS) video cellular service, a voice over Internet Protocol (VoIP) best effort cellular service, and a video best effort cellular service, or the like. The UE 12 also includes a media access control (MAC) layer 34 that may implement some of the functionality disclosed herein with regard to inter-communications with network nodes of the cellular environment 10, such as the cells 14, the MME 16 and the HSS 18, for example.

The MME 16 may also have SGTC information 36 to correlate service groups to cells, and SGTS information 38 to correlate service groups to service IDs. The SGTS information 38 may, for example, be configured into the MME 16 via an operator of the cellular environment 10. The MME 16 may obtain the SGTC information 36 from the cells 14, or via configuration.

Figure 2:
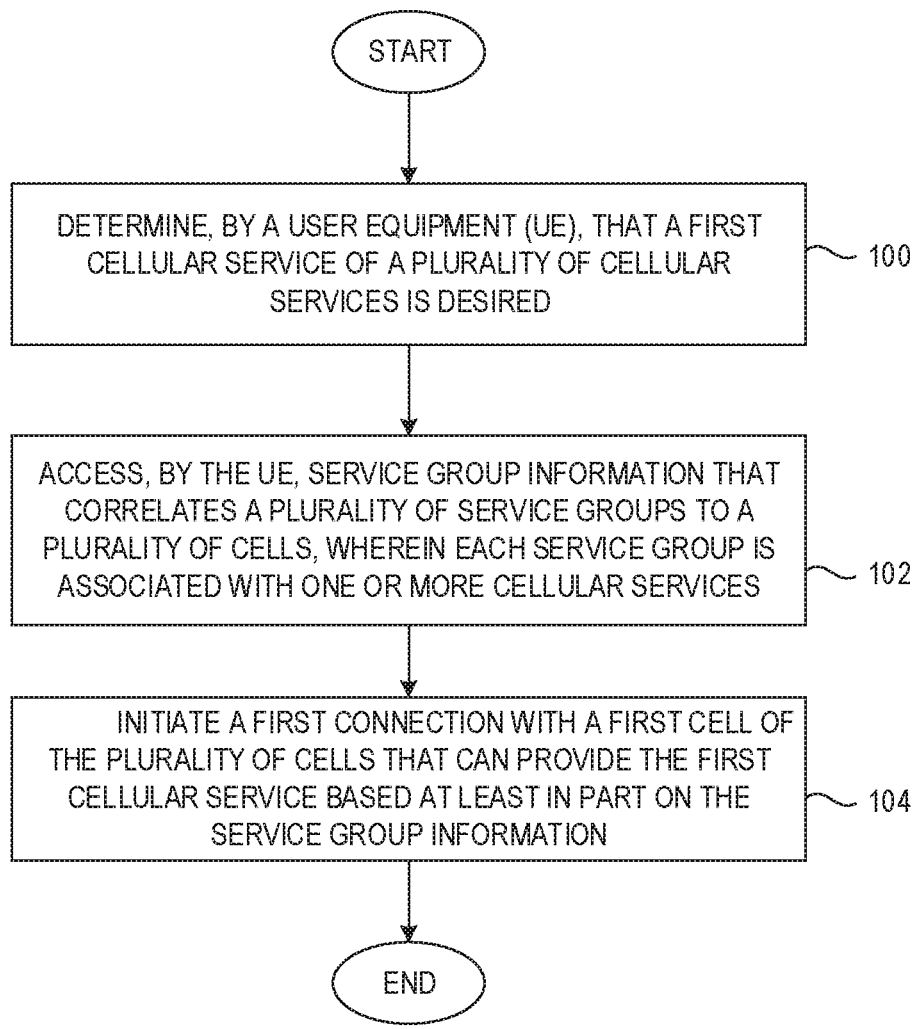
FIG. 2 is a flowchart of a method for connecting to a cell from the perspective of a user equipment (UE) according to one embodiment.

FIG. 2 is a flowchart of a method for connecting to the cell 14-1 from the perspective of the UE 12, according to one embodiment. FIG. 2 will be discussed in conjunction with FIG. 1. Assume that the UE 12 is in an idle state, and that it is determined that a first cellular service of a plurality of cellular services is desired (FIG. 2, block 100). In one example, this may occur, by way of non-limiting example, in response to a specific upper layer service 32 requesting a cellular service, such as VoLTE. The UE 12, via the MAC layer 34, accesses the service group information 28 that correlates a plurality of service groups to the plurality of cells 14, wherein each service group is associated with one or more cellular services (FIG. 2, block 102). In this example, assume that the service ID of the desired service is 1. Based on rows 27-1 and 27-2 of the SGTS information 26, the UE 12 determines that service groups 0 and 1 can support the desired service. The UE 12 may then access the SGTC information 24, and based on rows 25-1-25-2, determine that the cells 14-1, 14-3, and 14-4 support the service group 0, and that the cells 14-1 and 14-2 support the service group 1. The UE 12 may then determine certain measurements, such as the radio frequency (RF) signal strength between the UE 12 and the cells 14-1-14-4 to identify a particular cell 14 to which to connect. For purposes of illustration, assume that the UE 12 determines that the RF signal strength is greatest with the cell 14-1. The UE 12 then initiates a connection with the cell 14-1 (FIG. 2, block 104).

As will be discussed in greater detail below, when the UE 12 is in an idle state, the UE 12 may similarly use the service group information 28 in the selection of a cell 14 based on an incoming request to the UE 12 from the MME 16.

Figure 3:
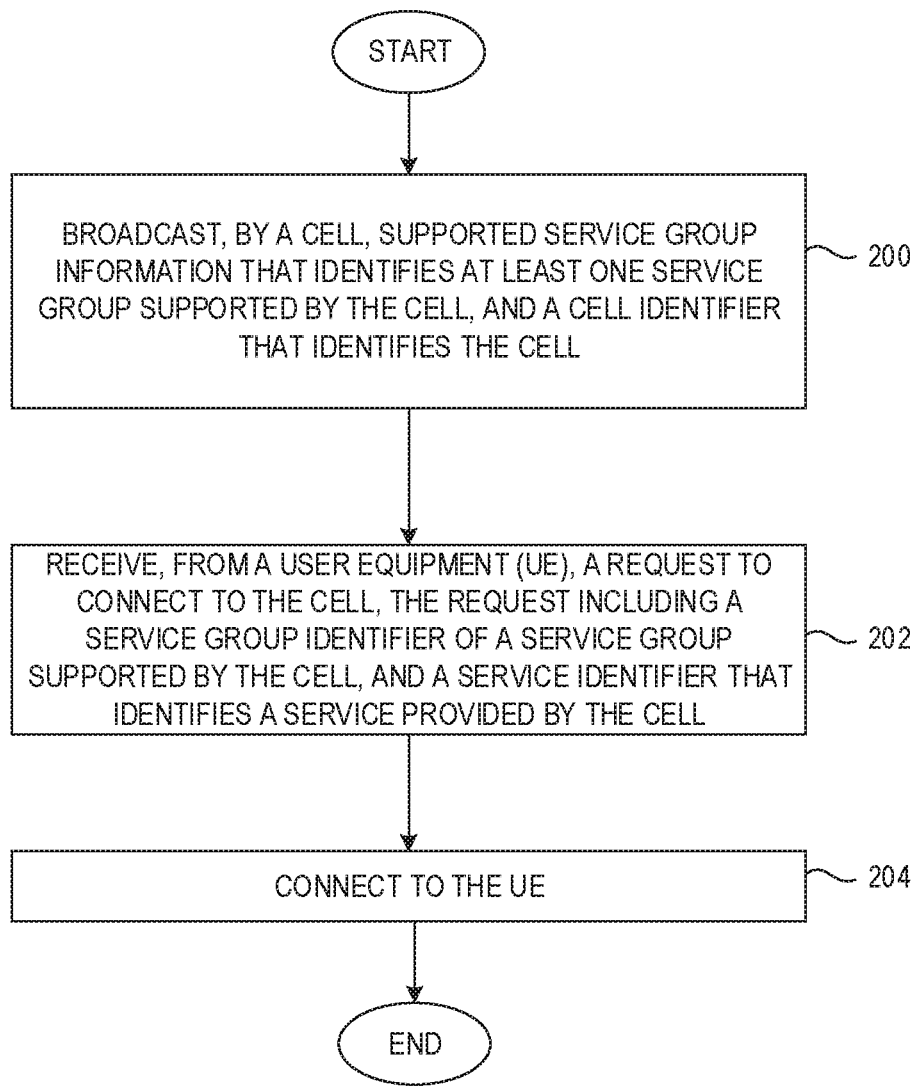
FIG. 3 is a flowchart of a method for connecting to the UE from the perspective of a cell, according to one embodiment.

FIG. 3 is a flowchart of a method for connecting to the UE 12 from the perspective of the cell 14-1, according to one embodiment. FIG. 3 will be discussed in conjunction with FIG. 1. The cell 14-1 broadcasts the supported service group information 22 that identifies at least one service group supported by the cell 14-1, and a cell identifier that identifies the cell 14-1 (FIG. 3, block 200). The UE 12 receives the supported service group information 22 and stores the information as part of the SGTC information 24. The UE 12 may subsequently use the SGTC information 24, as discussed above with regard to FIG. 2, to initiate a connection to the cell 14-1 to obtain a desired service. The connection initiation may contain a service group ID of the service group that supports the desired service, and the service ID of the desired service. The cell 14-1 receives, from the UE 12, a request to connect to the cell 14-1, the request including the service group ID associated with the cell 14-1, and a service ID that identifies the desired service provided by the cell 14-1 (FIG. 3, block 202). The cell 14-1 then connects to the UE 12 (FIG. 3, block 204).

Figure 4:
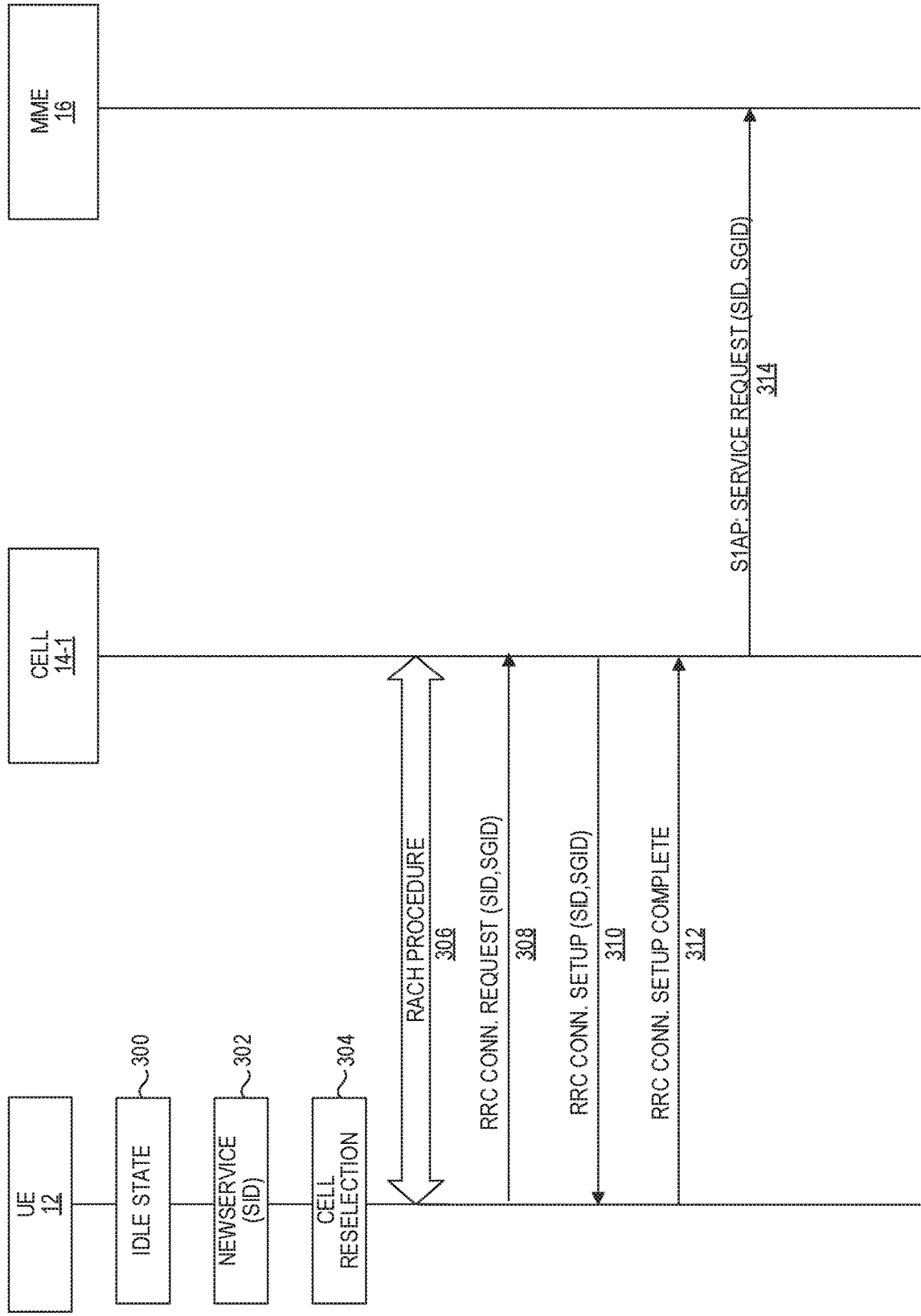
FIG. 4 is a message flow diagram illustrating the selection of a cell by the UE upon receiving a mobile-initiated request for a service in the context of a Long Term Evolution (LTE) cellular environment, according to one embodiment.

FIG. 4 is a message flow diagram illustrating the selection of a cell 14 by the UE 12 upon receiving a mobile-initiated request for a service in the context of an LTE cellular environment 10, according to one embodiment. FIG. 4 will be discussed in conjunction with FIG. 1. The UE 12 is initially in an idle state (FIG. 4, step 300). The upper layer service 32 (FIG. 1) requests a new service (FIG. 4, step 302). The UE 12 accesses the SGTS information 26 and determines the service group(s) that offers the requested service (FIG. 4, step 304). In this example, assume that the UE 12 identifies the cell 14-1 as supporting a service group associated with the suggested service, and that the cell 14-1 offers the strongest RF signal strength with the UE 12 over any other cell 14 that supports a service group associated with the suggested service. The UE 12 begins the random access procedure (RACH) with the cell 14-1 (FIG. 4, step 306). After completion of the RACH procedure, the UE 12 sends a Radio Resource Control (RRC) Connection Request to the cell 14-1 that includes the service group ID (SGID) of the selected service group, and the service ID (SID) of the desired service (FIG. 4, step 308). The cell 14-1 responds with an RRC Connection Setup message that includes the SGID and the SID received from the UE 12 (FIG. 4, step 310). Upon successful completion of the RRC connection establishment, the UE 12 responds to the cell 14-1 with an RRC Connection Setup Complete message (FIG. 4, step 312). The cell 14-1 may then send an S1 Application Protocol (S1AP) service request message to the MME 16 that includes the SGID of the respective service group, and the SID of the desired service (FIG. 4, step 314).

Figure 5:
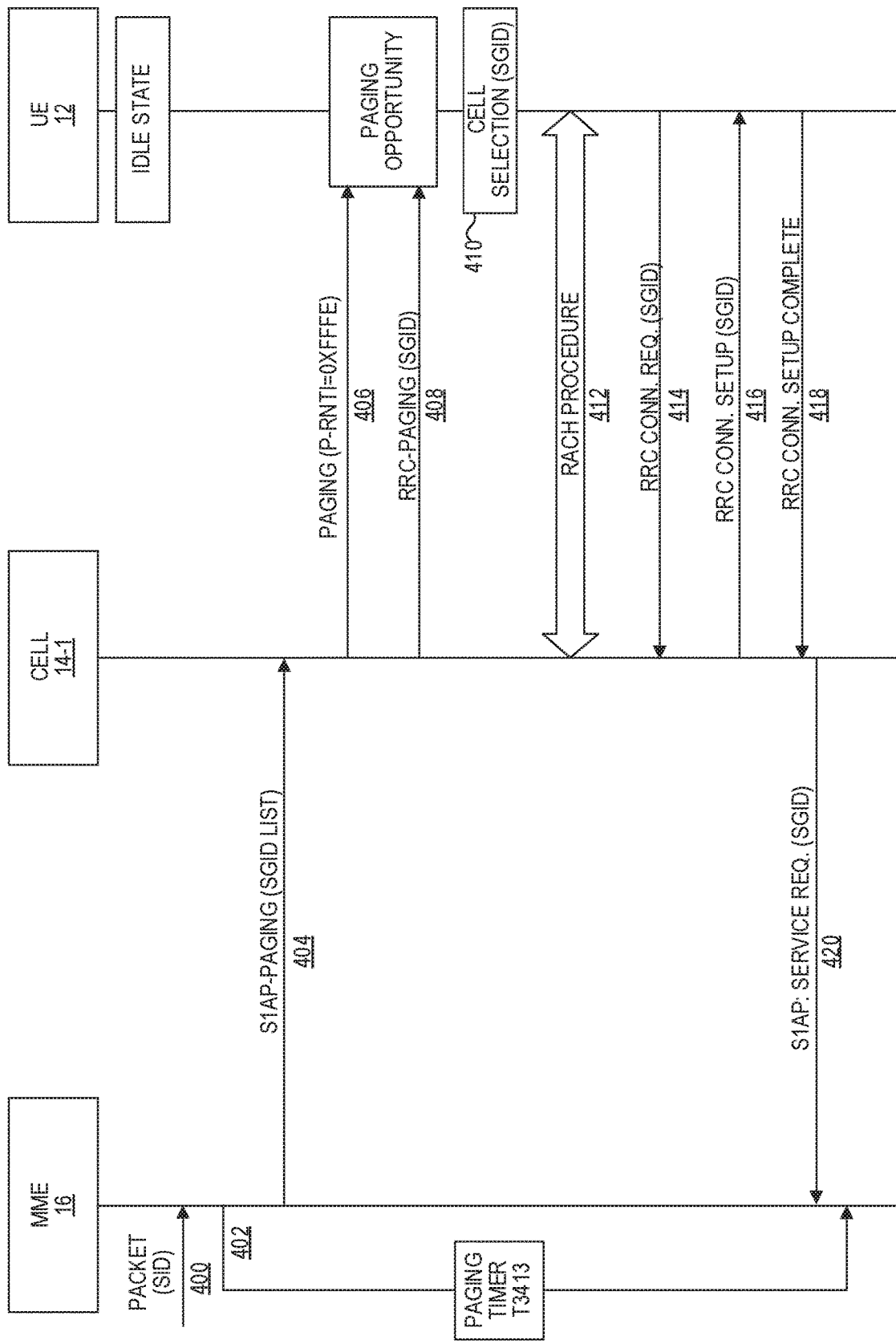
FIG. 5 is a message flow diagram illustrating the selection of a cell by the UE upon receiving a mobile terminated service request.

FIG. 5 is a message flow diagram illustrating the selection of a cell 14 by the UE 12 upon receiving a mobile terminated service request. FIG. 5 will be discussed in conjunction with FIG. 1. The MME 16 receives a packet from a downstream network node that is addressed to the UE 12. The packet includes a SID of the service with which the packet is associated, such as, by way of non-limiting example, a VoLTE cellular service (FIG. 5, step 400). The MME 16 accesses the SGTS information 38 and generates a SGID list that identifies each service group that offers the identified service. The SGID list may be a single SGID if only one service group offers the identified service. The MME 16 retrieves the last reported tracking area for the UE 12. The MME 16 starts a T3413 timer (FIG. 5, step 402). The MME 16 then sends an S1AP Paging message to the cells 14, in this example including the cell 14-1, that cover the last reported tracking area for the UE 12. The S1AP Paging message includes the SGID list that identifies each service group that offers the identified service (FIG. 5, step 404). The cell 14-1, in response to the S1AP Paging message, initiates a paging message with P-RNTI=0xFFFE over PDCCH (FIG. 5, step 406). The cell 14-1 also sends an RRC Paging message that includes the SGID list received from the MME 16 (FIG. 5, step 408).

The UE 12 receives the paging messages and accesses the SGTC information 24 to identify the cells 14 that offer the service groups identified in the SGID list. In this example, assume that the UE 12 selects, for example, the cell 14-1 as a cell that offers the service group and with which the UE 12 has a suitable RF signal strength (FIG. 5, step 410). The UE 12 begins the RACH procedure with the cell 14-1 (FIG. 5, step 412). The UE 12 then sends an RRC connection request that contains the SGID that identifies the service group that offers the desired service to the cell 14-1 (FIG. 5, step 414). The cell 14-1 responds with an RRC Connection Setup message that includes the SGID and the SID received from the UE 12 (FIG. 5, step 416). Upon successful completion of the RRC connection establishment, the UE 12 responds to the cell 14-1 with an RRC Connection Setup Complete message (FIG. 5, step 418). The cell 14-1 may then send an S1AP service request message to the MME 16 that includes the SGID of the respective service group (FIG. 5, step 420).

In one embodiment, the following new Information Element illustrated below in Table 2 may be added to the S1AP Paging message and the RRC Paging message to facilitate identification of the SGID or SGID list.

TABLE 2

| New IE | Value range | Description |
| --- | --- | --- |
| Service group ID or Service group ID list | 0 . . . 1023 | The service group ID or service group ID list for the UE to use. The UE uses this field to help select the cell to RACH on from the cells that support this service group ID and that have paged it |

Figure 6A:
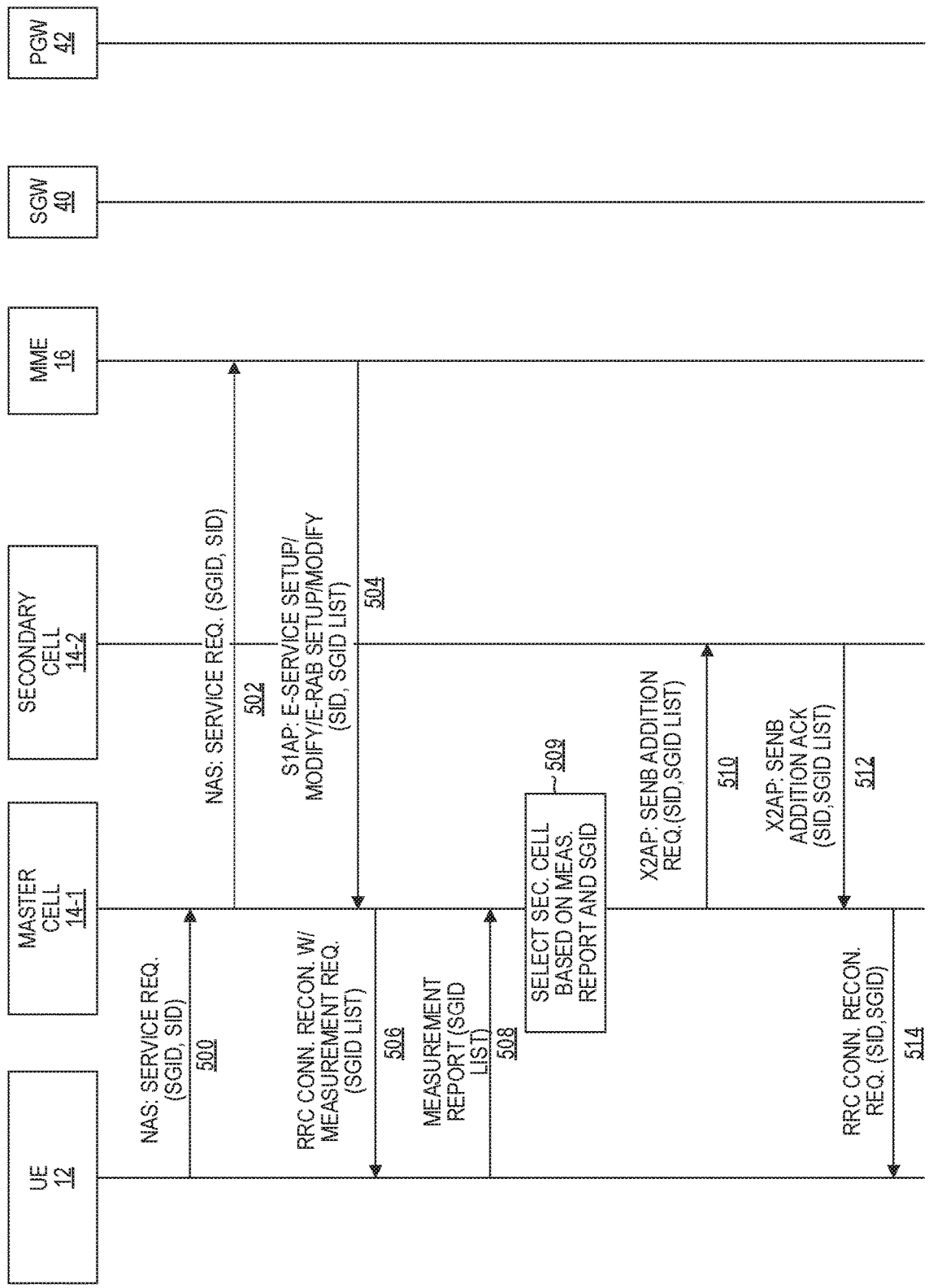
FIGS. 6A-6B are a message flow diagram illustrating a mobile initiated service request using dual connectivity, according to one embodiment.
Figure 6B:
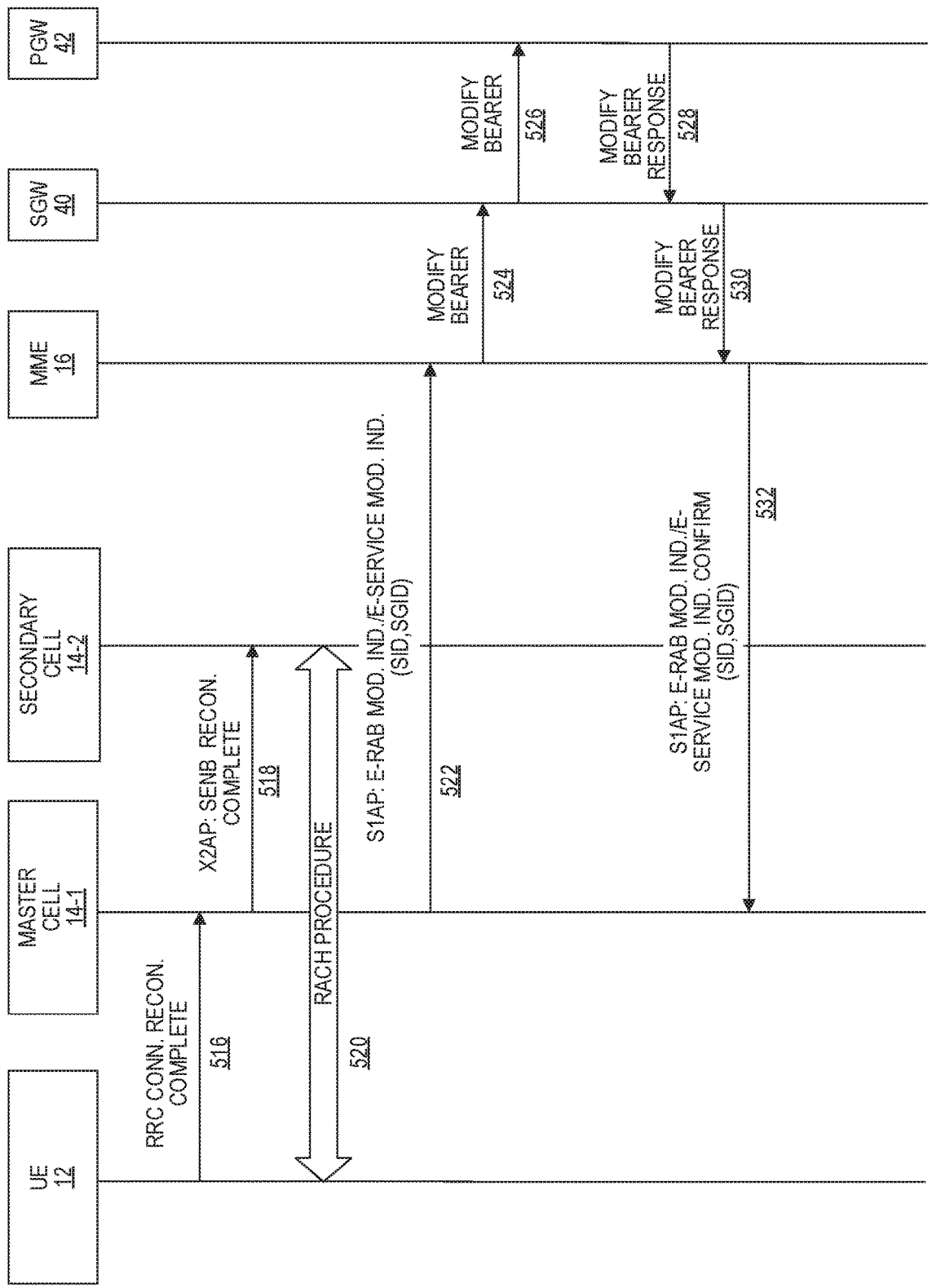

FIGS. 6A-6B are a message flow diagram illustrating a message flow sequence for a mobile initiated service request using dual connectivity, according to one embodiment. FIGS. 6A-6B will be discussed in conjunction with FIG. 1. In this example, assume that the UE 12 is already connected to the cell 14-1 and is receiving a service from the cell 14-1. The cell 14-1 will be referred to as the master cell for purposes of FIGS. 6A-6B. The UE 12 requires a second service concurrently with the first service the UE 12 is already receiving from the cell 14-1. The UE 12 accesses the SGTS information 26 to determine the service groups associated with the second service, and the SGTC information 24 to determine the cells 14 that support the service groups associated with the request service. The UE 12 determines that the master cell 14-1 does not support a service group that supports the second service. The UE 12 sends to the master cell 14-1 a non-access stratum (NAS) service request message that includes the SGID of the service group associated with the desired second service and optionally the SID (FIG. 6A, step 500). The master cell 14-1 sends a NAS service request message to the MME 16 that includes the SGID of the respective service group and optionally the SID (FIG. 6A, step 502). The MME 16 sends an S1AP E-Service Setup/Modify/E-RAB Setup/Modify message to the master cell 14-1 that includes the SID and an SGID list of service groups that can support the second service (FIG. 6A, step 504).

The master cell 14-1 sends to the UE 12 an RRC connection reconfiguration with measurement report message that includes the SGID list received from the MME 16 (FIG. 6A, step 506). The UE 12 generates a measurement report that identifies characteristics of signals between the UE and one or more cells 14 associated with the one or more service groups identified in the SGID list and sends the measurement report to the master cell 14-1 (FIG. 6A, step 508). The characteristics may, for example, quantify a signal strength between the UE 12 and the cells 14. The master cell 14-1 selects a secondary cell 14-2 based on the measurement report and SGID list, and sends an X2AP SeNB (SENB, throughout the figures, generally refers to a secondary cell which may comprise, for example, an eNodeB) addition request to the secondary cell 14-2 that includes the SGID list and a list of service IDs (FIG. 6A, steps 509-510). The secondary cell 14-2 allocates bearers and returns a X2AP SeNB addition acknowledgement (ACK) to the master cell 14-1 (FIG. 6A, step 512). The master cell 14-1 notifies the UE 12 of the new secondary cell 14-2 via an RRC connection reconfiguration request that includes the SGID and SID (FIG. 6A, step 514). The UE 12 sends an RRC connection reconfiguration complete message to the master cell 14-1 (FIG. 6B, step 516). The master cell 14-1 sends an X2AP SeNB reconfiguration complete message to the secondary cell 14-2 (FIG. 6B, step 518). The UE 12 begins the RACH procedure with the secondary cell 14-2 (FIG. 6B, step 520). The master cell 14-1 sends an S1AP E-RAB Modification Indication/E-Service Modification Indication message to the MME 16 that includes the SID and the SGID) (FIG. 6B, step 522). The MME 16 sends a modify bearer message to a serving gateway (SGW) 40 (FIG. 6B, step 524). The SGW 40 sends a modify bearer message to a packet data network gateway (PGW) 42 (FIG. 6B, step 526). The PGW 42 sends a modify bearer response to the SGW 40 (FIG. 6B, step 528). The SGW 40 sends a modify bearer response to the MME 16 (FIG. 6B, step 530). The MME 16 sends an S1AP E-RAB Modification Indication/E-Service Modification Indication Confirm to the master cell 14-1 (FIG. 6B, step 532).

The following are proposed changes to the 3GPP standards that may be useful in implementing the functionality discussed above in FIGS. 6A-6B in an LTE context:
TS 36.423: X2-AP
    The following messages shall be modified to include service information (Service IDs and service group ID list):
    SeNB Addition Request
    SeNB Addition Request Acknowledge
TS 36.413: S1AP
    The following S1AP Messages are introduced:
    E-Service Modification Indication: sent by the master cell 14-1 to the MME 16 to inform the MME 16 that the new services are configured in the secondary cell 14-2.
    E-Service Modification Confirm: sent by the MME 16 to the master cell 14-1 to confirm the changes at the MME 16 are complete.
TS 36.331: RRC
    RRC: Measurement Configure message is modified to include service group ID list to be added/Modified/Removed.

```
MeasObjectEUTRA ::= SEQUENCE {
    carrierFreq ARFCN-ValueEUTRA,
    allowedMeasBandwidth,
    presenceAntennaPort1,
    neighCellConfig,
    offsetFreq Q-OffsetRange DEFAULT dB0,
    --Service group
    servicegroupsToRemoveList
    servicegroupsToAddModList
    -- Cell list
    cellsToRemoveList CellIndexList OPTIONAL, -- Need ON
    cellsToAddModList OPTIONAL, -- Need ON
    -- Black list
    blackCellsToRemoveList CellIndexList OPTIONAL, -- Need ON
```

Figure 7A:
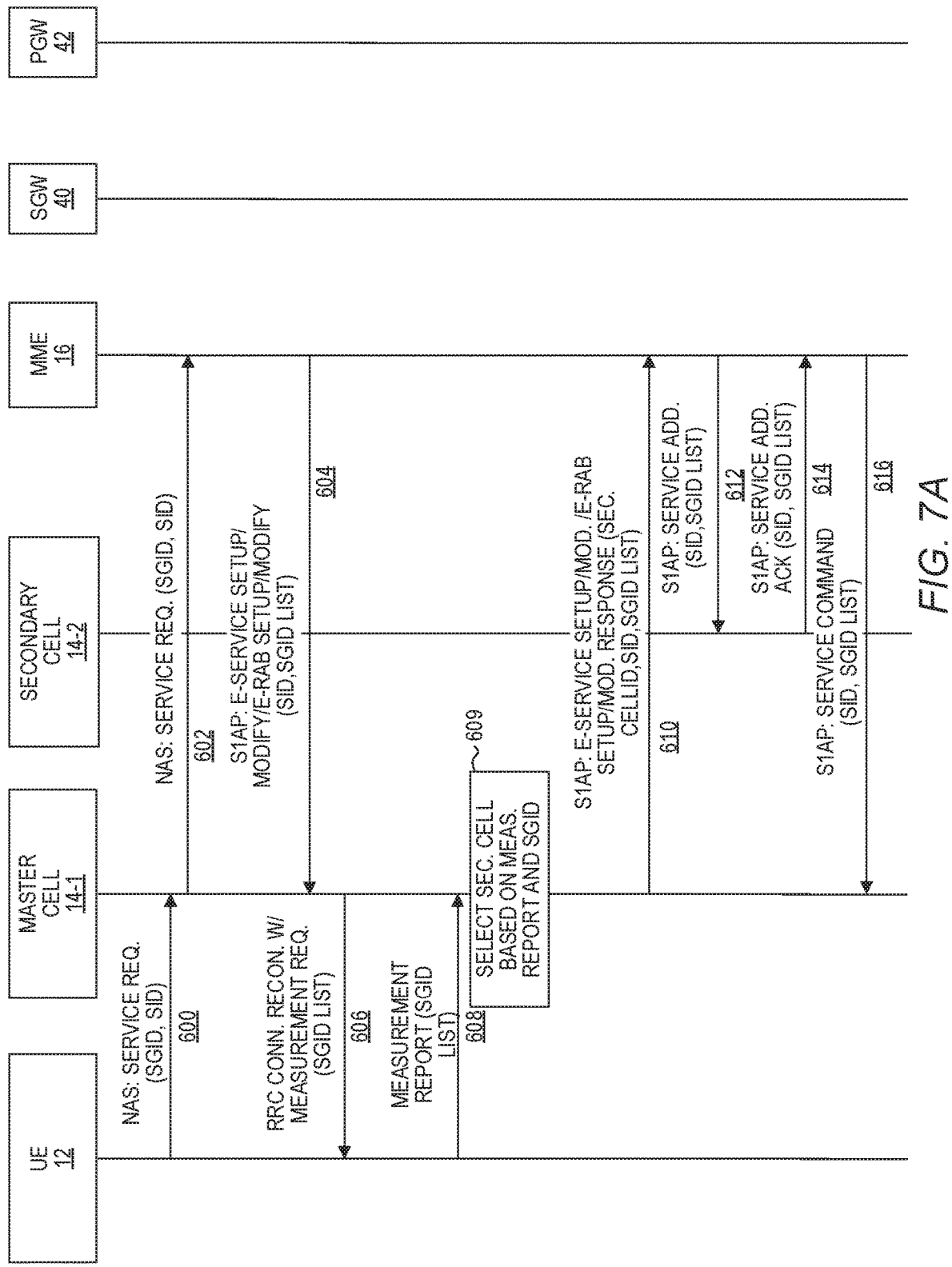
FIGS. 7A-7B are a message flow diagram illustrating a mobile initiated service request using dual connectivity utilizing an S1AP service procedure, according to one embodiment.
Figure 7B:
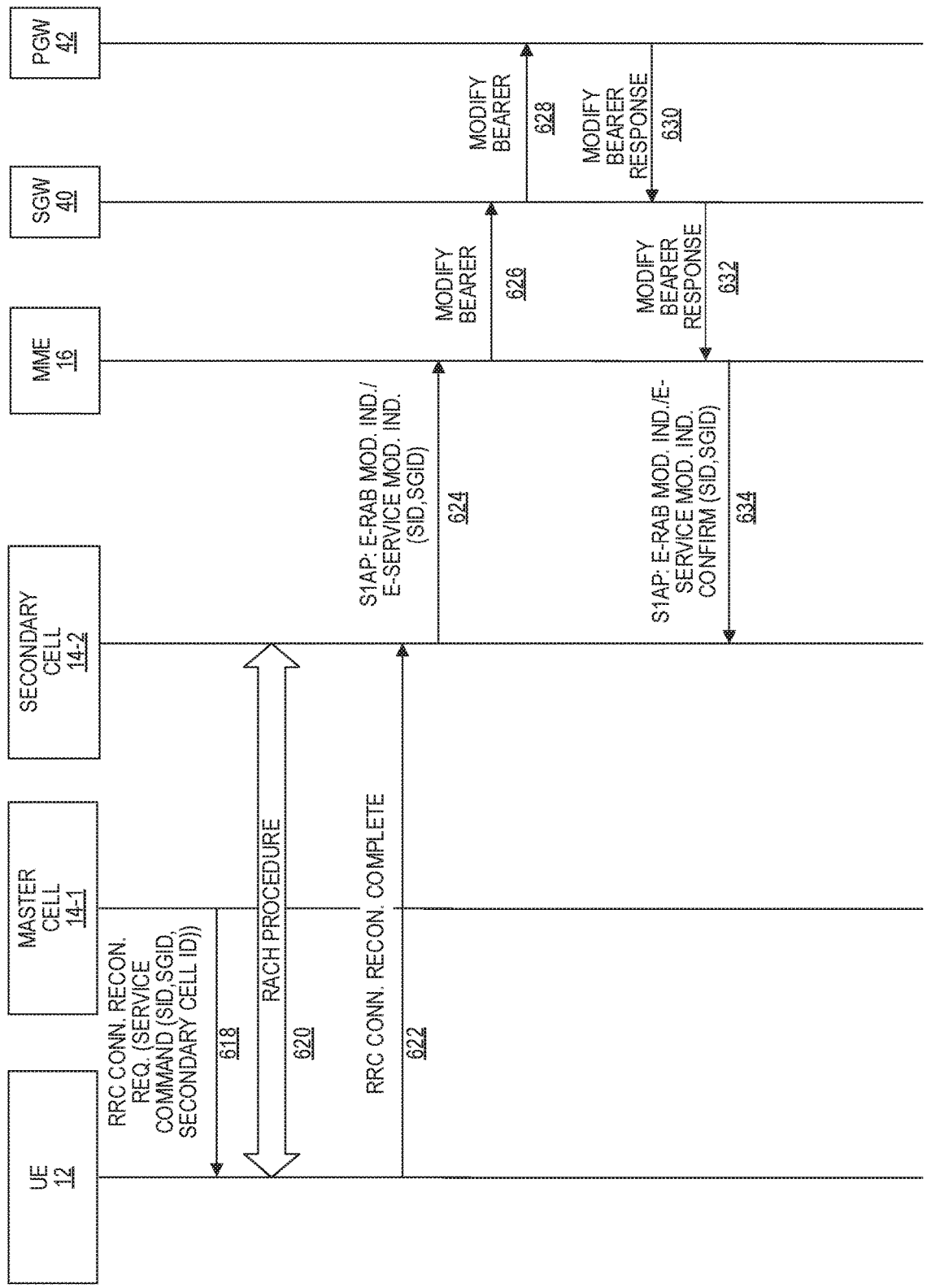

The following RRC message shall be modified to include service information:
RRC Connection Reconfiguration FIGS. 7A-7B are a message flow diagram illustrating a message flow sequence for a mobile initiated service request using dual connectivity, according to another embodiment. FIGS. 7A-7B will be discussed in conjunction with FIG. 1. Steps 600-609 of FIG. 7A are substantially similar to the corresponding steps 500-509 of FIG. 6A and for the sake of brevity will not be repeated. After selecting the secondary cell 14-2, the master cell 14-1 sends an S1AP E-Service Setup/Modify/E-RAB Setup/Modify message to the MME 16 that includes the ID of the second cell 14-2, the SID, and the SGID list (FIG. 7A, step 610). The MME 16 sends an S1AP Service Addition message that includes the SGID list of the service groups that support the requested service to the secondary cell 14-2 (FIG. 7A, step 612). The secondary cell 14-2 responds with an S1AP Service Addition Acknowledgement that includes the SID and the SGID list (FIG. 7A, step 614). The MME 16 sends an S1AP service command that includes the SID and the SGID list to the master cell 14-1 (FIG. 7A, step 616). The master cell 14-1 sends the UE 12 an RRC connection reconfiguration request that includes the Service Command with the SID, the SGID for the new requested service, and the identifier of the secondary cell 14-2 (FIG. 7B, step 618). The UE 12 begins the RACH procedure with the secondary cell 14-2 (FIG. 7B, step 620). The UE 12 sends an RRC connection reconfiguration complete message to the secondary cell 14-2 (FIG. 7B, step 622). The secondary cell 14-2 sends an S1AP E-RAB Modification Indication/E-Service Modification Indication message to the MME 16 that includes the SID and the SGID) (FIG. 7B, step 624). The MME 16 sends a modify bearer message to the SGW 40 (FIG. 7B, step 626). The SGW 40 sends a modify bearer message to the PGW 42 (FIG. 7B, step 628). The PGW 42 sends a modify bearer response to the SGW 40 (FIG. 7B, step 630). The SGW 40 sends a modify bearer response to the MME 16 (FIG. 7B, step 632). The MME 16 sends an S1AP E-RAB Modification Indication/E-Service Modification Indication Confirm to the secondary cell 14-2 (FIG. 7B, step 634).

The following are proposed changes to the 3GPP standards that may be useful in implementing the functionality discussed above in FIGS. 7A-7B in an LTE context:
TS 36.413: S1AP
    The following S1AP Messages are proposed:
    Service Indication: sent by master cell 14-1 to the MME 16 to request preparation of new service at the target eNB (secondary cell 14-2);
    Service Command: sent by the MME 16 to inform the master cell 14-1 that resource at the secondary cell 14-2 is prepared for new service;
    Service Addition: sent by the MME 16 to the master cell 14-1 to request the preparation of resources for new service;
    Service Addition Acknowledge: sent by the secondary cell 14-2 to inform the MME 16 about the prepared resource for service;
    Service Addition Failure: sent by the MME 16 to inform the master cell 14-1 that the service Preparation has failed;
    Service Modification Indication: sent by the master cell 14-1 to the MME 16 to inform that the new services are configured in the secondary cell 14-2;
    Service Modification Confirm: sent by the MME 16 to the master cell 14-1 to confirm changes at the MME 16 is complete; and Service Release Request: sent by the MME 16 to the master cell 14-1 to release the services.

Figure 8A:
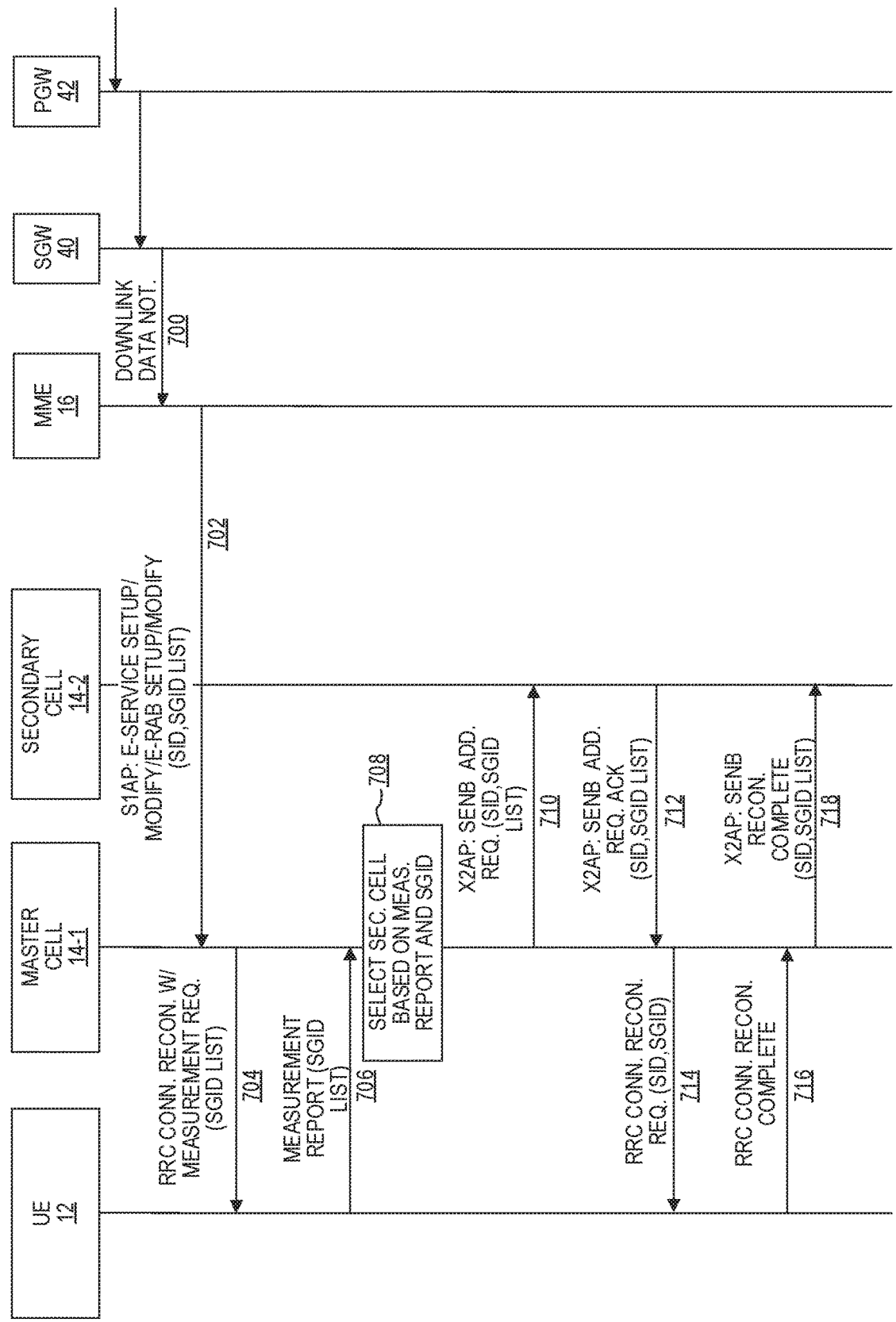
FIGS. 8A-8B are a message flow diagram illustrating a mobile terminated service request using dual connectivity, according to one embodiment.
Figure 8B:
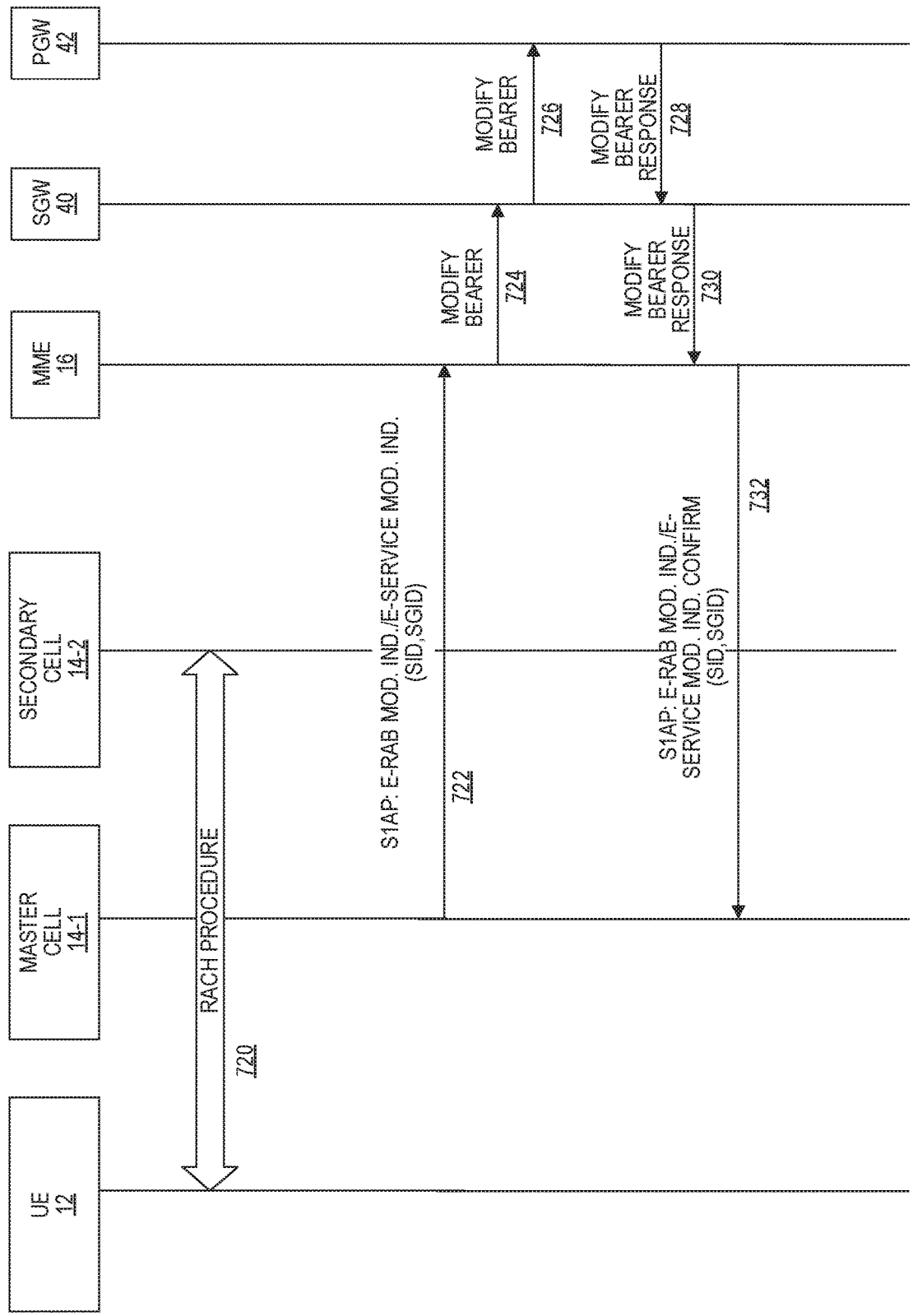

FIGS. 8A-8B are a message flow diagram illustrating a message flow sequence for a mobile terminated service request using dual connectivity, according to one embodiment. FIGS. 8A-8B will be discussed in conjunction with FIG. 1. In this example, the MME 16 receives a downlink data notification that includes a packet of data associated with a new service destined for the UE 12, which is already being provided a service by the master cell 14-1 (FIG. 8A, step 700). The MME 16 determines the service groups associated with the new service. Assume that the MME 16 determines that the master cell 14-1 does not support a service group that supports the new service. The MME 16 sends an S1AP E-Service Setup/Modify/E-RAB Setup/Modify message to the master cell 14-1 that includes a SGID list of service groups that can support the second service and the SID of the new service (FIG. 8A, step 702). The master cell 14-1 sends to the UE 12 an RRC connection reconfiguration with measurement report message that includes the SGID list received from the MME 16 (FIG. 8A, step 704). The UE 12 generates and sends to the master cell 14-1 a measurement report that identifies characteristics of signals between the UE 12 and one or more cells 14 associated with the one or more service groups identified in the SGID list (FIG. 8A, step 706). The characteristics may, for example, quantify a signal strength between the UE 12 and the cells 14. The master cell 14-1 selects the secondary cell 14-2 based on the measurement report, and sends an X2AP SeNB addition request to the secondary cell 14-2 that includes the SGID list and the SID of the new service (FIG. 8A, steps 708-710).

The secondary cell 14-2 allocates bearers and returns a X2AP SeNB addition request acknowledgement to the master cell 14-1 (FIG. 8A, step 712). The master cell 14-1 notifies the UE 12 of the new secondary cell 14-2 via an RRC connection reconfiguration request that includes the SGID and SID (FIG. 8A, step 714). The UE 12 sends an RRC connection reconfiguration complete message to the master cell 14-1 (FIG. 8A, step 716). The master cell 14-1 sends an X2AP SeNB reconfiguration complete message to the secondary cell 14-2 (FIG. 8A, step 718). The UE 12 begins the RACH procedure with the secondary cell 14-2 (FIG. 8B, step 720). The master cell 14-1 sends an S1AP E-RAB Modification Indication/E-Service Modification Indication message to the MME 16 that includes the SID and the SGID) (FIG. 8B, step 722). The MME 16 sends a modify bearer message to the SGW 40 (FIG. 8B, step 724). The SGW 40 sends a modify bearer message to the PGW 42 (FIG. 8B, step 726). The PGW 42 sends a modify bearer response to the SGW 40 (FIG. 8B, step 728). The SGW 40 sends a modify bearer response to the MME 16 (FIG. 8B, step 730). The MME 16 sends an S1AP E-RAB Modification Indication/E-Service Modification Indication Confirm to the master cell 14-1 (FIG. 8B, step 732).

Figure 9A:
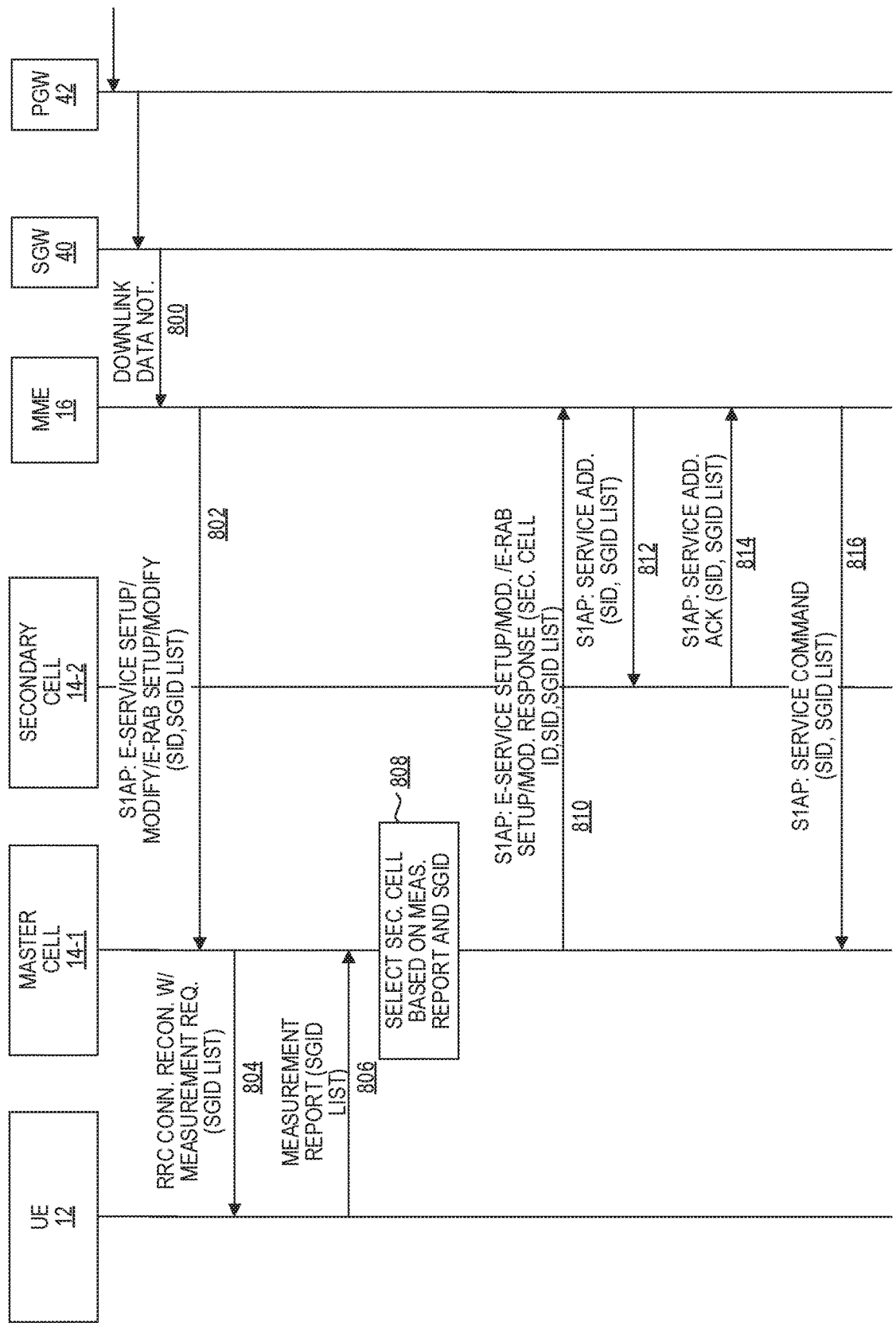
FIGS. 9A-9B are a message flow diagram illustrating a mobile terminated service request using dual connectivity utilizing an S1AP service procedure, according to one embodiment.
Figure 9B:
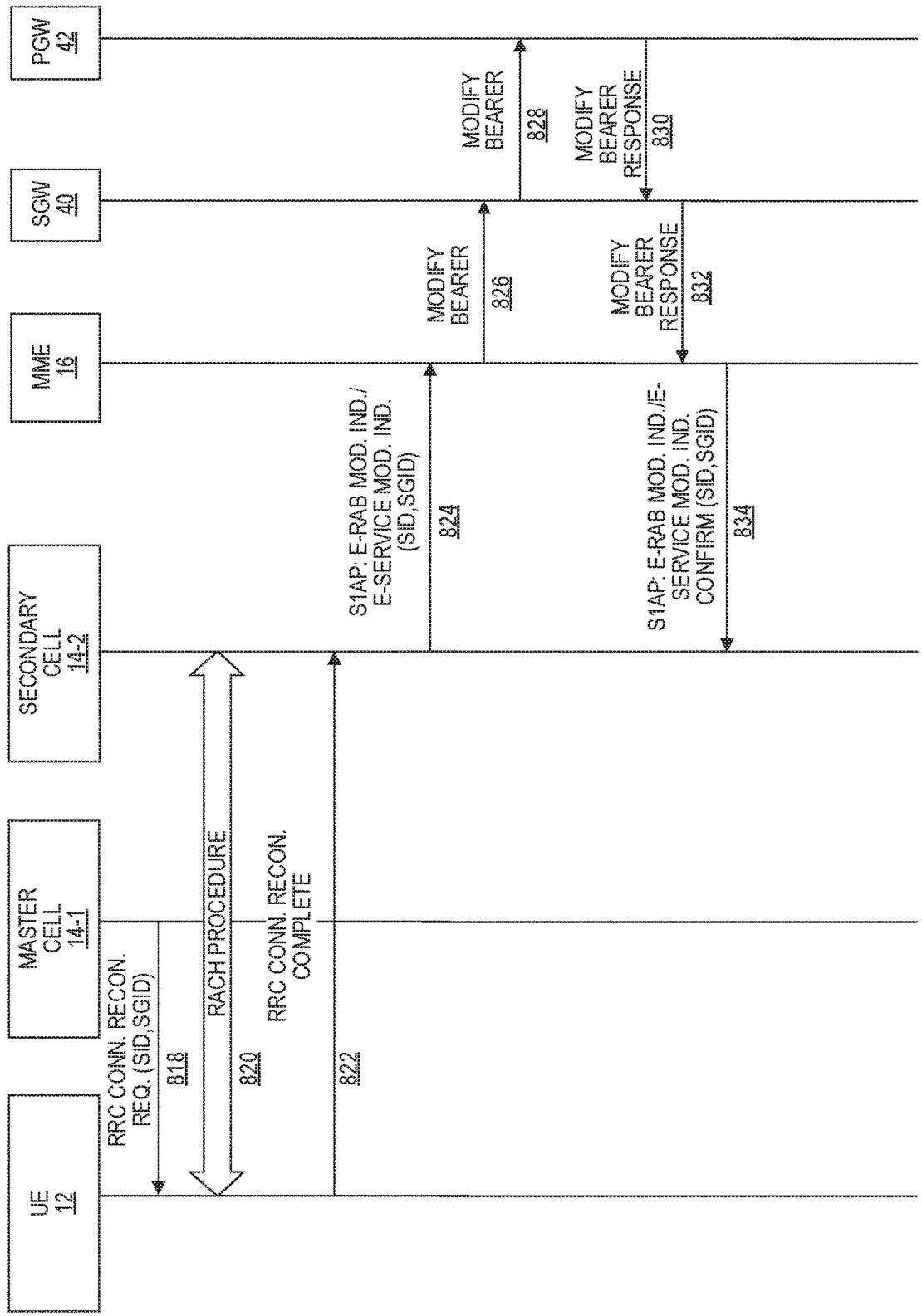

FIGS. 9A-9B are a message flow diagram illustrating a message flow sequence for a mobile terminated service request using dual connectivity utilizing an S1AP service procedure, according to one embodiment. FIGS. 9A-9B will be discussed in conjunction with FIG. 1. Steps 800-808 of FIG. 9A are substantially similar to the corresponding steps 700-708 of FIG. 8A and for the sake of brevity will not be repeated. After selecting the secondary cell 14-2, the master cell 14-1 sends an S1AP E-Service Setup/Modify/E-RAB Setup/Modify message to the MME 16 that includes the ID of the second cell 14-2, the SID, and the SGID list (FIG. 9A, step 810). The MME 16 sends an S1AP Service Addition message that includes the SGID list of the service groups that support the requested service to the secondary cell 14-2 (FIG. 9A, step 812). The secondary cell 14-2 responds with an S1AP Service Addition Acknowledgement that includes the SID and the SGID list (FIG. 9A, step 814). The MME 16 sends an S1AP service command that includes the SID and the SGID list to the master cell 14-1 (FIG. 9A, step 816). The master cell 14-1 sends the UE 12 an RRC connection reconfiguration request that includes the Service Command with the SGID for the new requested service (FIG. 9B, step 818). The UE 12 begins the RACH procedure with the secondary cell 14-2 (FIG. 9B, step 820). The UE 12 sends an RRC connection reconfiguration complete message to the secondary cell 14-2 (FIG. 9B, step 822). The secondary cell 14-2 sends an S1AP E-RAB Modification Indication/E-Service Modification Indication message to the MME 16 that includes the SID and the SGID (FIG. 9B, step 824). The MME 16 sends a modify bearer message to the SGW 40 (FIG. 9B, step 826). The SGW 40 sends a modify bearer message to the PGW 42 (FIG. 9B, step 828). The PGW 42 sends a modify bearer response to the SGW 40 (FIG. 9B, step 830). The SGW 40 sends a modify bearer response to the MME 16 (FIG. 9B, step 832). The MME 16 sends an S1AP E-RAB Modification Indication/E-Service Modification Indication Confirm to the secondary cell 14-2 (FIG. 9B, step 834).

While for purposes of illustration the embodiments disclose the connection of the UE 12 to two different cells 14 for two different services, it will be apparent that the embodiments are not limited to connections to only two cells 14, and that the UE 12 may connect to any number of cells 14 for any desired number of services.

Figure 10:
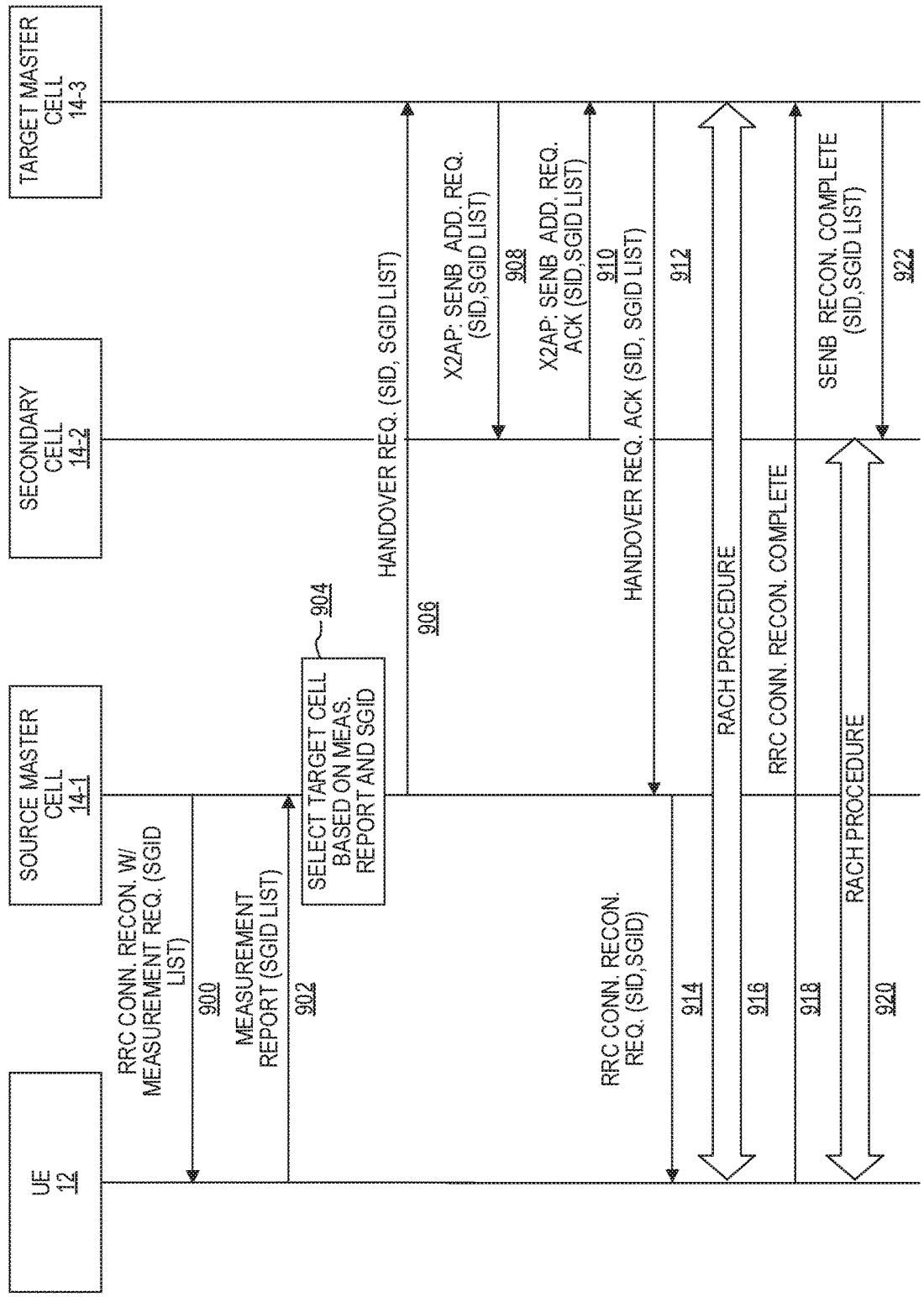
FIG. 10 is a message flow diagram illustrating the handover from one master cell to another master cell of the UE that is also connected to a secondary cell based on X2 messaging, according to one embodiment.

FIG. 10 is a message flow diagram illustrating the handover from one master cell 14 to another master cell 14 of the UE 12 that is also connected to a secondary cell 14 based on X2 messaging, according to one embodiment. FIG. 10 will be discussed in conjunction with FIG. 1. The master cell 14-1 sends to the UE 12 an RRC connection reconfiguration with measurement report message that includes an SGID list of the service groups being used by the UE 12 (FIG. 10, step 900). The UE 12 generates and sends to the master cell 14-1 a measurement report that identifies characteristics of signals between the UE 12 and one or more cells 14 associated with the one or more service groups identified in the SGID list (FIG. 10, step 902). The master cell 14-1 selects a target master cell 14-3 based on the measurement report and SGID (FIG. 10, step 904). The master cell 14-1 sends a handover request to the target master cell 14-3 that includes the SID of the services in use by the UE 12 (??) and the SGID list (FIG. 10, step 906). The target master cell 14-3 sends an X2AP SeNB addition request to the secondary cell 14-2 that includes the SGID list and a list of service IDs (FIG. 10, step 908). The secondary cell 14-2 allocates bearers and returns an X2AP SeNB addition request acknowledgement to the target master cell 14-3 (FIG. 10, step 910). The target master cell 14-3 sends a handover request acknowledgment that includes the SID and the SGID list to the source master cell 14-1 (FIG. 10, step 912). The source master cell 14-1 notifies the UE 12 of the new master cell 14-3 via an RRC connection reconfiguration request that includes the SGID and SID (FIG. 10, step 914). The UE 12 begins the RACH procedure with the new master cell 14-3 (FIG. 10, step 916). The UE 12 sends an RRC connection reconfiguration complete message to the new master cell 14-3 (FIG. 10, step 918). The UE 12 begins the RACH procedure with the secondary cell 14-2

(FIG. 10, step 920). The new master cell 14-3 sends a SeNB reconfiguration complete message to the secondary cell 14-2 (FIG. 10, step 922).

Figure 11A:
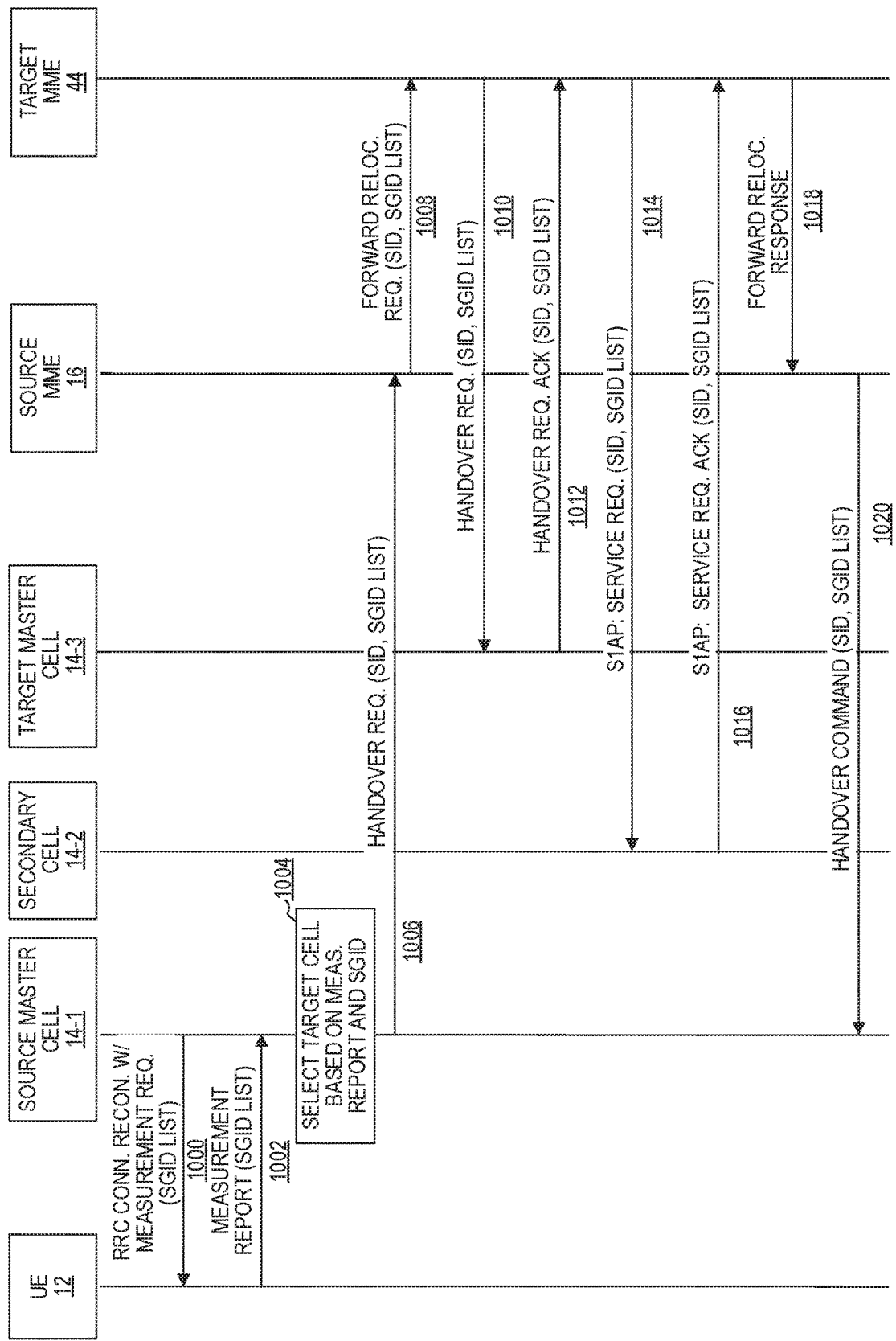

FIGS. 11A-11B are a message flow diagram illustrating the handover from one master cell 14 to another master cell 14 of the UE 12 that is also connected to a secondary cell 14 based on S1AP messaging, according to one embodiment. FIGS. 11A-11B will be discussed in conjunction with FIG. 1. The master cell 14-1 sends to the UE 12 an RRC connection reconfiguration with measurement report message that includes a SGID list of the service groups being used by the UE 12 (FIG. 11A, step 1000). The UE 12 generates and sends to the master cell 14-1 a measurement report that identifies characteristics of signals between the UE 12 and one or more cells 14 associated with the one or more service groups identified in the SGID list (FIG. 11A, step 1002). The master cell 14-1 selects a target master cell 14-3 based on the measurement report and SGID (FIG. 11A, step 1004). The master cell 14-1 sends a handover request to the source MME 16 that includes the SID of the services in use by the UE 12 and the SGID list (FIG. 11A, step 1006). The source MME 16 sends a forward relocation request message to a target MME 44 (FIG. 11A, step 1008). The target MME 44 sends a handover request to the target master cell 14-3 (FIG. 11A, step 1010). The target master cell 14-3 replies with a handover request acknowledgement (FIG. 11A, step 1012). The target MME 44 sends an S1AP service request message to the secondary cell 14-2 (FIG. 11A, step 1014). The secondary cell 14-2 replies with an S1AP service request acknowledgement (FIG. 11A, step 1016). The target MME 44 sends a forward relocation response message to the source MME 16 (FIG. 11A, step 1018). The source MME 16 sends a handover command to the source master cell 14-1 (FIG. 11A, step 1020). The source master cell 14-1 notifies the UE 12 of the new master cell 14-3 via an RRC connection reconfiguration request that includes the SGID and SID (FIG. 11B, step 1022). The UE 12 begins the RACH procedure with the new master cell 14-3 (FIG. 11B, step 1024). The UE 12 sends an RRC connection reconfiguration complete message to the new master cell 14-3 (FIG. 11B, step 1026). The UE 12 begins the RACH procedure with the secondary cell 14-2 (FIG. 11B, step 1028). The new master cell 14-3 sends an SeNB reconfiguration complete message to the secondary cell 14-2 (FIG. 11B, step 1030).

Figure 12:
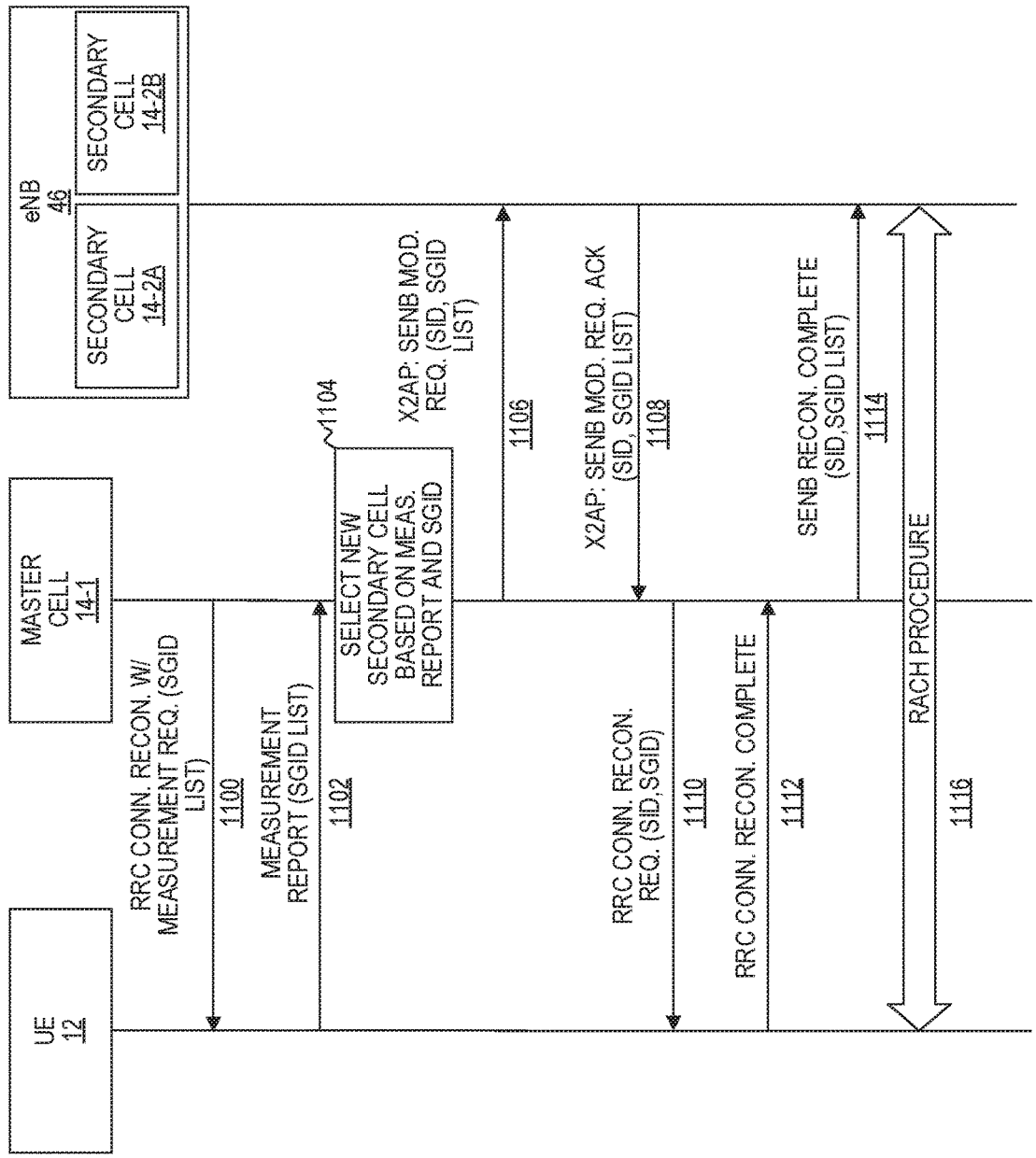
FIG. 12 is a message flow diagram illustrating a method for moving a UE from one secondary cell to another secondary cell where both secondary cells are implemented by the same enode-B (eNB), according to one embodiment.

FIGS. 12-15B are message flow diagrams illustrating various methods by which the UE 12 may move from one secondary cell 14 to another secondary cell 14, such as may occur, for example, if the UE 12 and the initial secondary cell 14 no longer have sufficient signal strength to reliably communicate with one another. FIG. 12 is a message flow diagram illustrating a method for moving the UE 12 from one secondary cell 14-2A to another secondary cell 14-2B where both secondary cells 14 are implemented by the same eNB 46, according to one embodiment. The master cell 14-1 sends to the UE 12 an RRC connection reconfiguration with measurement report message that includes the SGID list that identifies the service groups used by the UE 12 (FIG. 12, step 1100). The UE 12 generates and sends to the master cell 14-1 a measurement report that identifies characteristics of signals between the UE 12 and one or more cells 14 associated with the one or more service groups identified in the SGID list (FIG. 12, step 1102). The characteristics may, for example, quantify a signal strength between the UE 12 and the cells 14. The master cell 14-1 selects the secondary cell 14-2B based on the measurement report and the SGID, and sends an X2AP SeNB Modification Request with the SID and SGID list to the eNB 46 (FIG. 12, steps 1104-1106). The X2AP SeNB Modification Request indicates that the UE 12 is being moved from the secondary cell 14-2A to the secondary cell 14-2B. The eNB 46 responds with an X2AP SeNB Modification Request Acknowledgement to the master cell 14-1 (FIG. 12, step 1108). The master cell 14-1 notifies the UE 12 of the new secondary cell 14-2B via an RRC connection reconfiguration request that includes the SGID and SID (FIG. 12, step 1110). The UE 12 sends an RRC connection reconfiguration complete message to the master cell 14-1 (FIG. 12, step 1112). The master cell 14-1 sends an SeNB reconfiguration complete message to the eNB 46 that includes the SGID and SID (FIG. 12, step 1114). The UE 12 begins the RACH procedure with the secondary cell 14-2B (FIG. 12, step 1116).

Figure 13:
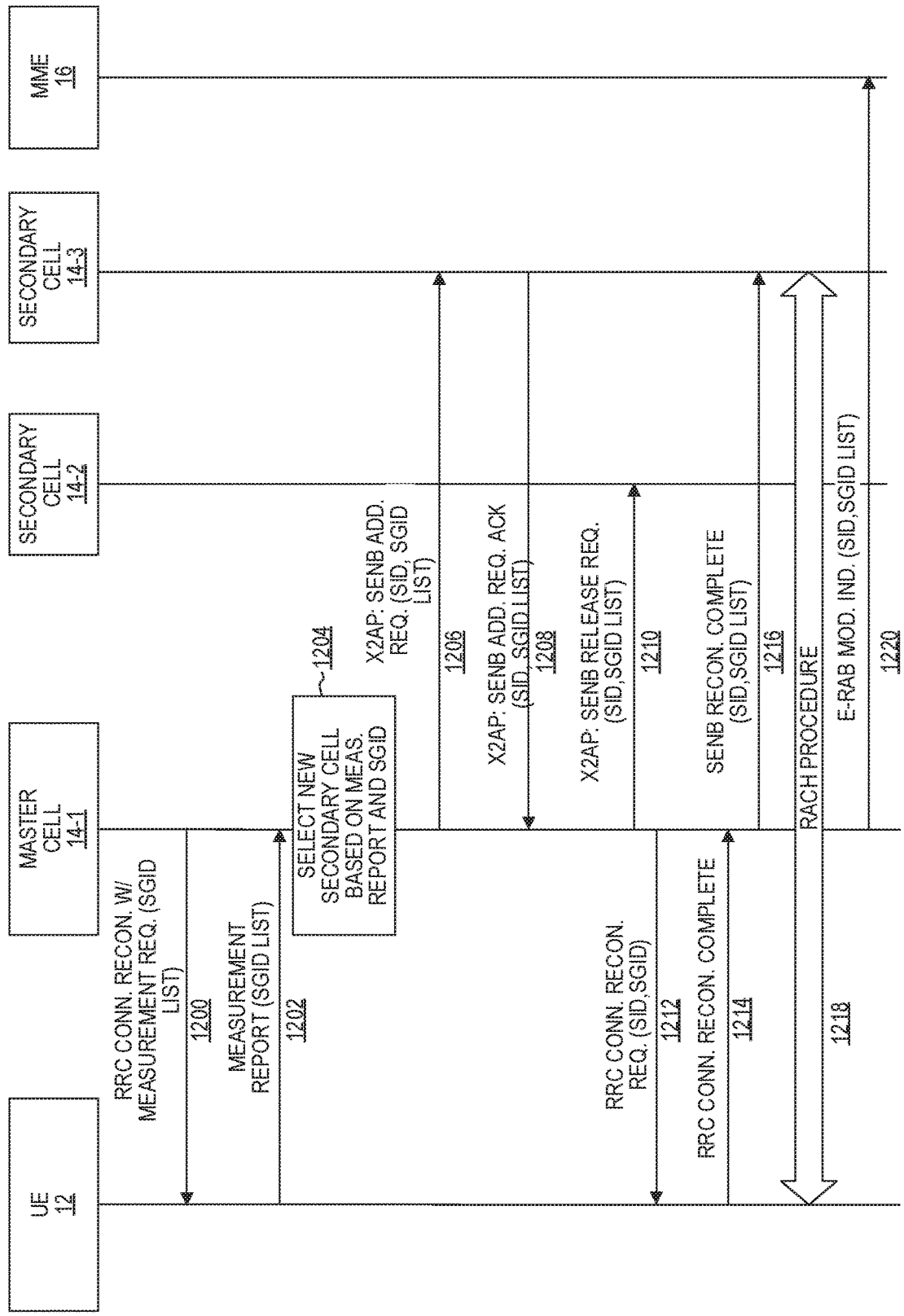
FIG. 13 is a message flow diagram illustrating a method for moving a UE from one secondary cell to another secondary cell that is implemented on a different eNB using the X2 protocol, according to one embodiment.

FIG. 13 is a message flow diagram illustrating a method for moving the UE 12 from one secondary cell 14-2 to another secondary cell 14-3 that is implemented on a different eNB using the X2 protocol, according to one embodiment. The master cell 14-1 sends to the UE 12 an RRC connection reconfiguration with measurement report message that includes the SGID list that identifies the service groups used by the UE 12 (FIG. 13, step 1200). The UE 12 generates a measurement report that identifies characteristics of signals between the UE 12 and one or more cells 14 associated with the one or more service groups identified in the SGID list (FIG. 13, step 1202). The master cell 14-1 selects the secondary cell 14-3 based on the measurement report and SGID, and sends an X2AP SeNB addition request with the SID and SGID list to the secondary cell 14-3 (FIG. 13, steps 1204-1206). The secondary cell 14-3 responds with an X2AP SeNB addition request acknowledgement (FIG. 13, step 1208). The master cell 14-1 sends to the secondary cell 14-2 an X2AP SeNB release request that includes the SID and the SGID list (FIG. 13, step 1210). The master cell 14-1 notifies the UE 12 of the new secondary cell 14-3 via an RRC connection reconfiguration request that includes the SGID and SID (FIG. 13, step 1212). The UE 12 sends an RRC connection reconfiguration complete message to the master cell 14-1 (FIG. 13, step 1214). The master cell 14-1 sends an SeNB reconfiguration complete message to the secondary cell 14-3 (FIG. 13, step 1216). The UE 12 begins the RACH procedure with the secondary cell 14-3 (FIG. 13, step 1218). The master cell 14-1 sends an E-RAB modification indication message to the MME 16 (FIG. 13, step 1220).

Figure 14:
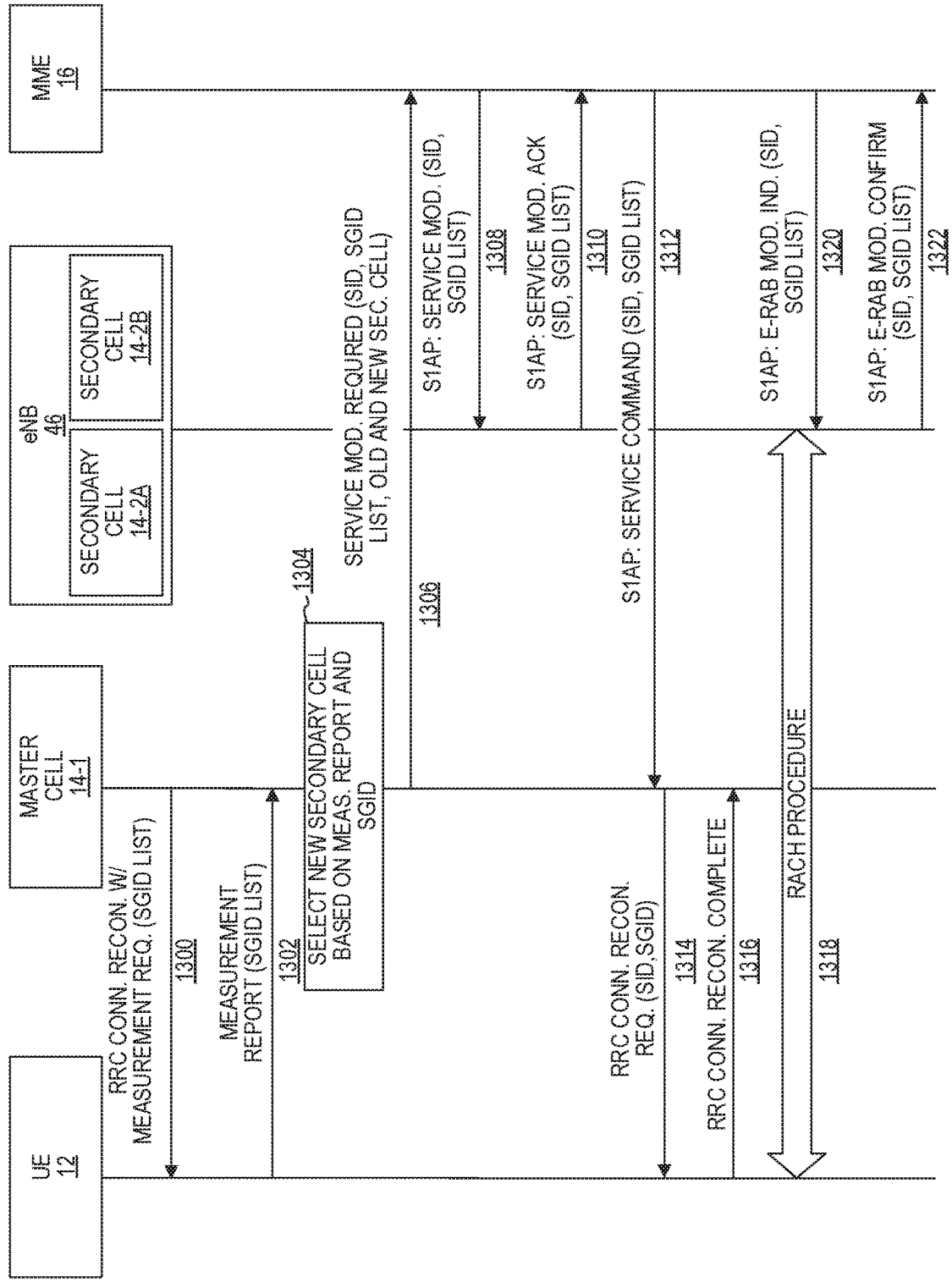
FIG. 14 is a message flow diagram illustrating a method for moving a UE from one secondary cell to another secondary cell that is implemented on the same eNB using the S1AP protocol, according to one embodiment.

FIG. 14 is a message flow diagram illustrating a method for moving the UE 12 from one secondary cell 14-2A to another secondary cell 14-2B that is implemented on the same eNB 46 using the S1AP protocol, according to one embodiment. The master cell 14-1 sends to the UE 12 an RRC connection reconfiguration with measurement report message that includes the SGID list that identifies the service groups used by the UE 12 (FIG. 14, step 1300). The UE 12 generates a measurement report that identifies characteristics of signals between the UE and one or more cells 14 associated with the one or more service groups identified in the SGID list (FIG. 14, step 1302). The master cell 14-1 selects the secondary cell 14-2B based on the measurement report and SGID, and sends a service modification required message to the MME 16 that identifies the previous secondary cell 14-2A, the new secondary cell 14-2B, and the SID and SGIDs used by the UE 12 (FIG. 14, steps 1304-1306).

The MME 16 sends an S1AP service modification message with the SID and SGID list to the eNB 46 (FIG. 14, step 1308). If the secondary cell 14-2A and the secondary cell 14-2B were on different eNBs, the MME 16 would send an S1AP service addition message would be sent to the eNB on which the secondary cell 14-2B was implemented, and an S1AP service release message to the eNB on which the secondary cell 14-2A was implemented.

The eNB 46 responds with a secondary cell modification acknowledgement (FIG. 14, step 1310). The MME 16 sends an S1AP service command message to the master cell 14-1 with the SID and the SGID list (FIG. 14, step 1312). The master cell 14-1 notifies the UE 12 of the new secondary cell 14-2B via an RRC connection reconfiguration request that includes the SGID and SID (FIG. 14, step 1314). The UE 12 sends an RRC connection reconfiguration complete message to the master cell 14-1 (FIG. 14, step 1316). The UE 12 begins the RACH procedure with the secondary cell 14-2B (FIG. 14, step 1318). The MME 16 sends an S1AP E-RAB Modification Indication message with the SID and the SGID list to the eNB 46 (FIG. 14, step 1320). The eNB 46 responds with an S1AP E-RAB modification confirm message with the SID and the SGID list (FIG. 14, step 1322).

Figure 15A:
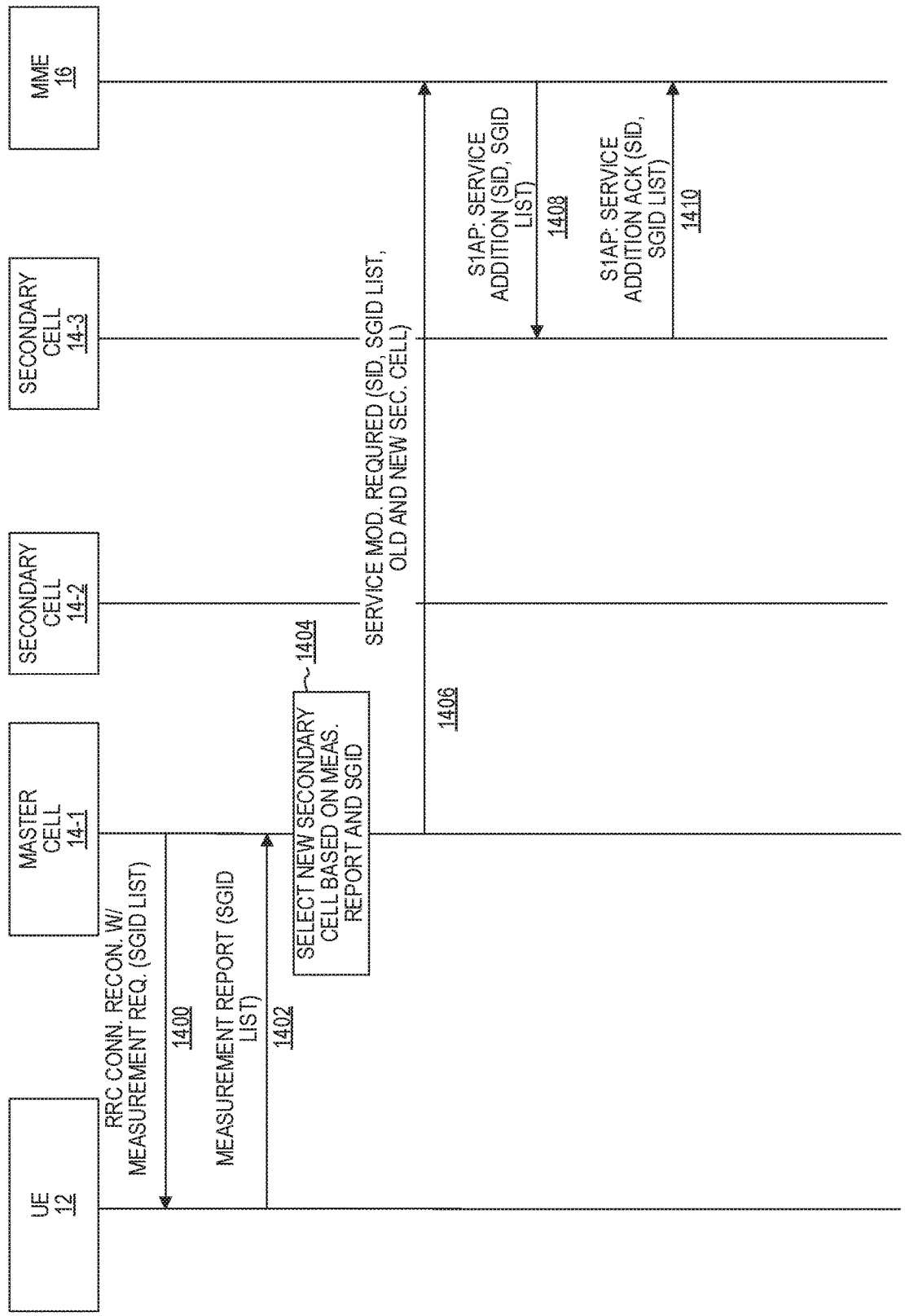
FIGS. 15A-15B are a message flow diagram illustrating a method for moving a UE from one secondary cell to another secondary cell 14-3 that is implemented on a different eNB using the S1AP protocol, according to one embodiment.
Figure 15B:
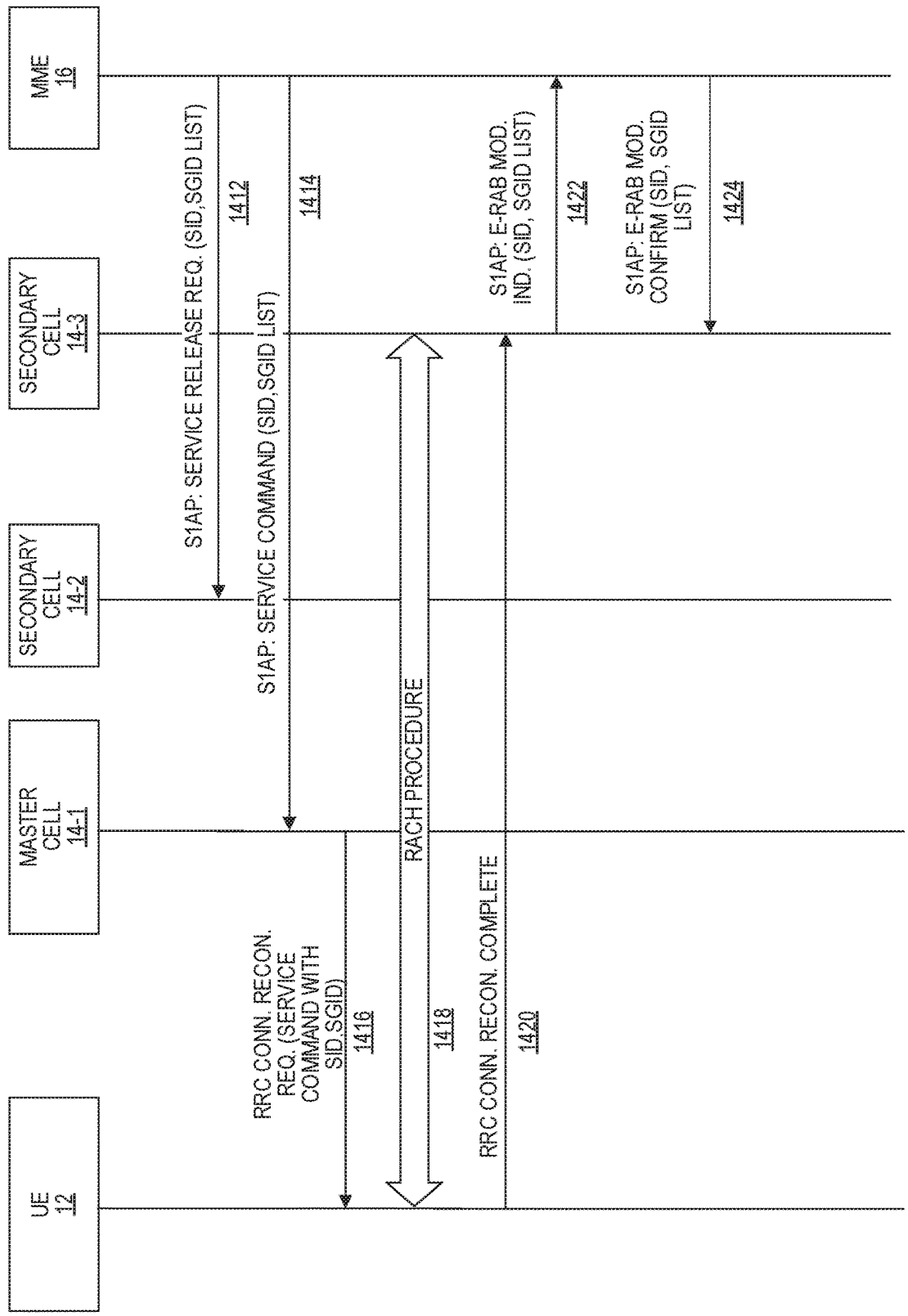

FIGS. 15A-15B are a message flow diagram illustrating a method for moving the UE 12 from one secondary cell 14-2 to another secondary cell 14-3 that is implemented on a different eNB using the S1AP protocol, according to one embodiment. The master cell 14-1 sends to the UE 12 an RRC connection reconfiguration with measurement report message that includes the SGID list that identifies the service groups used by the UE 12 (FIG. 15A, step 1400). The UE 12 generates and sends to the master cell 14-1 a measurement report that identifies characteristics of signals between the UE and one or more cells 14 associated with the one or more service groups identified in the SGID list (FIG. 15A, step 1402). The master cell 14-1 selects the secondary cell 14-3 based on the measurement report and the SGID, and sends a service modification required message to the MME 16 that identifies the previous secondary cell 14-2, the new secondary cell 14-3, and the SID and SGIDs used by the UE 12 (FIG. 15A, steps 1404-1406). The MME 16 sends an S1AP service addition message to the secondary cell 14-3 that includes the SID and the SGID list (FIG. 15A, step 1408). The secondary cell 14-3 responds with an S1AP service addition acknowledgement (FIG. 15A, step 1410). The MME 16 sends an S1AP service release request message to the secondary cell 14-2 (FIG. 15B, step 1412). The MME 16 sends an S1AP service command to the master cell 14-1 (FIG. 15B, step 1414). The master cell 14-1 notifies the UE 12 of the new secondary cell 14-3 via an RRC connection reconfiguration request that includes the SGID and SID (FIG. 15B, step 1416). The UE 12 begins the RACH procedure with the secondary cell 14-3 (FIG. 15B, step 1418). The UE 12 sends an RRC connection reconfiguration complete message to the secondary cell 14-3 (FIG. 15B, step 1420). The secondary cell 14-3 sends an S1AP E-RAB Modification Indication message with the SID and the SGID list to the MME 16 (FIG. 15B, step 1422). The MME 16 responds with an S1AP E-RAB modification confirm message with the SID and the SGID list (FIG. 15B, step 1424).

Figure 16:
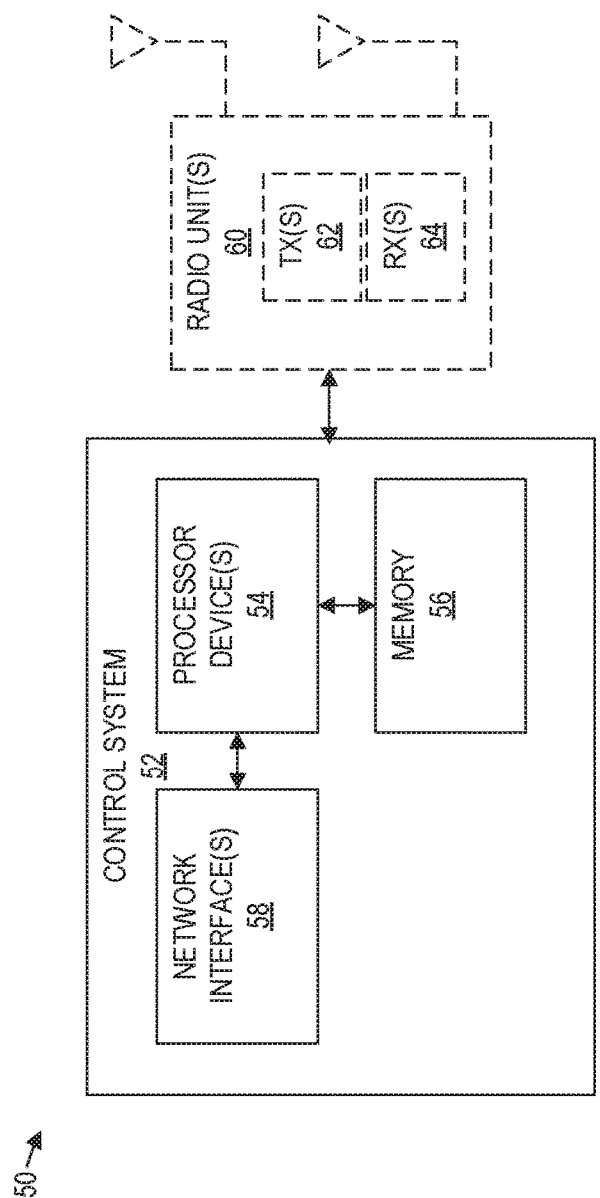
FIGS. 16-18 are schematic block diagrams illustrating example embodiments of a network node, according to various embodiments.

FIG. 16 is a schematic block diagram of a network node 50 according to some embodiments of the present disclosure. The network node 50 may be any network node disclosed herein, including any of the cells 14, the MME 16, the UE 12, or the like. As illustrated, the network node 50 includes a control system 52 that includes circuitry operable to perform the functionality of the network node 50 disclosed herein. In this example, the circuitry includes one or more processor devices 54 (e.g., Central Processing Units (CPUs), Application Specific Integrated Circuits (ASICs), Field Programmable Gate Arrays (FPGAs), Digital Signal Processors (DSPs), and/or the like) and memory 56. The network node 50 also includes a network interface 58. The network node 50 may also include one or more radio units 60 that each include one or more transmitters 62 and one or more receivers 64 coupled to one or more antennas. In some embodiments, the functionality of the network node 50 (i.e., the functionality of cells 14, MME 16, or the UE 12) described above may be fully or partially implemented in software that is, e.g., stored in the memory 56 and executed by the processor device(s) 54.

Figure 17:
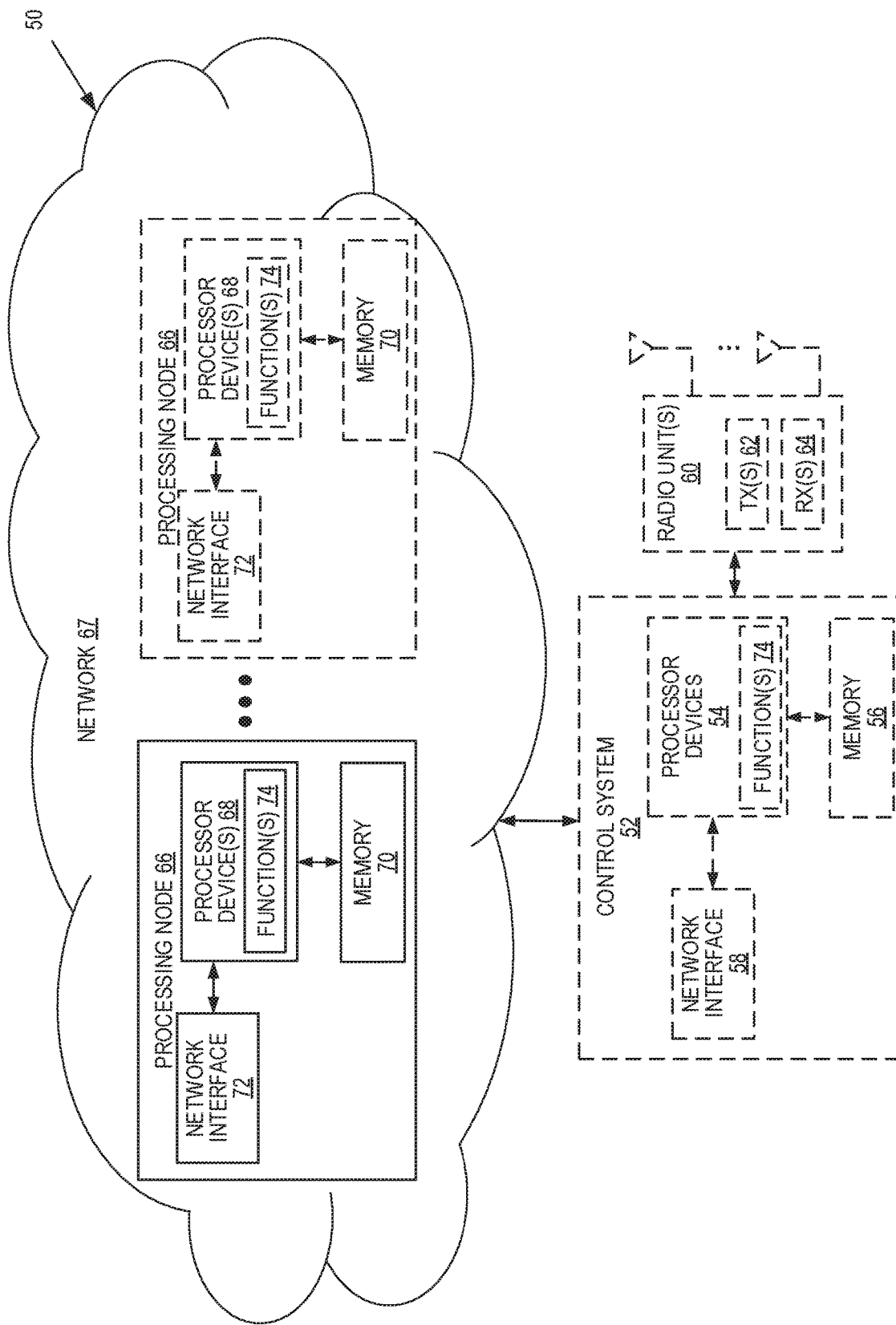

FIG. 17 is a schematic block diagram that illustrates a virtualized embodiment of some of the network nodes 50 (e.g., the cells 14 or the MME 16) according to some embodiments of the present disclosure. As used herein, a "virtualized" network node 50 is a network node 50 in which at least a portion of the functionality of the network node 50 is implemented as a virtual component (e.g., via a virtual machine(s) executing on a physical processing node(s) in a network(s)). As illustrated, the network node 50 optionally includes the control system 52, as described with respect to FIG. 16. The control system 52 (if present) is connected to one or more processing nodes 66 coupled to or included as part of a network(s) 67 via the network interface 58. Alternatively, if the control system 52 is not present, the one or more radio units 60 (if present) are connected to the one or more processing nodes 66 via a network interface(s). Alternatively, all of the functionality of the network node 50 (e.g., all of the functionality of the MME 16 or the cells 14) described herein may be implemented in the processing nodes 66. Each processing node 66 includes one or more processor devices 68 (e.g., CPUs, ASICs, DSPs, FPGAs, and/or the like), memory 70, and a network interface 72.

In this example, functions 74 of the network node 50 (e.g., the functions of the MME 16 or the cells 14) described herein are implemented at the one or more processing nodes 66 or distributed across the control system 52 (if present) and the one or more processing nodes 66 in any desired manner. In some particular embodiments, some or all of the functions 74 of the network node 50 described herein are implemented as virtual components executed by one or more virtual machines implemented in a virtual environment(s) hosted by the processing node(s) 66. As will be appreciated by one of ordinary skill in the art, additional signaling or communication between the processing node(s) 66 and the control system 52 (if present) or alternatively the radio unit(s) 60 (if present) is used in order to carry out at least some of the desired functions 74. Notably, in some embodiments, the control system 52 may not be included, in which case the radio unit(s) 60 (if present) communicate directly with the processing node(s) 66 via an appropriate network interface(s) 72.

In some embodiments, a computer program including instructions which, when executed by the at least one processor devices 54, 68, cause the at least one processor device 54, 68 to carry out the functionality of the network node 50 or a processing node 66 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 56, 70).

Figure 18:
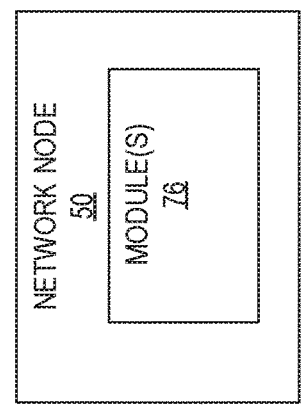

FIG. 18 is a schematic block diagram of the network node 50 according to some other embodiments of the present disclosure. The network node 50 includes one or more modules 76, each of which is implemented in software. The module(s) 76 provide the functionality of the network node 50 described herein.

For example, if the network node 50 is the UE 12, the module(s) 76 include a receiving module (optional) for receiving a request from the core network of cells 14, as discussed above, and a sending module operable to send a power source status indication to a core network node (e.g., the MME 16), the power source status indication being indicative of a type of power source being used by a Radio Access Network (RAN) UE 12.

As another example, if the network node 50 is the MME 16, the module(s) 76 include a cellular service determination module, an access module, and a connection initiation module. The cellular service determination module is configured to determine that a first cellular service of a plurality of cellular services is desired. The access module is configured to access service group information that correlates a plurality of service groups to a plurality of cells, wherein each service group is associated with one or more cellular services. The connection initiation module is configured to initiate a connection with a first cell of the plurality of cells that can provide the first cellular service based at least in part on the service group information.

As another example, if the network node 50 is the cell 14-1, the module(s) 76 include a broadcast module, a receiver module and a connection module. The broadcast module is configured to broadcast supported service group information that identifies at least one service group supported by the cell, and a cell identifier that identifies the cell. The receiver module is configured to receive a request to connect to the cell, the request including a service group identifier of a service group supported by the cell and including a service identifier that identifies a service provided by the cell. The connection module is configured to connect to the UE.

The following acronyms are used throughout this disclosure.
  3GPP Third Generation Partnership Project
  ACK Acknowledgement
  ASICs Application Specific Integrated Circuits
  CPUs Central Processing Units
  DSPs Digital Signal Processors
  eNB Enode-B
  FPGAs Field Programmable Gate Arrays
  ID Identifier
  IMS Internet Protocol Multimedia Subsystem
  LTE Long Term Evolution
  MAC Media Access Control
  MME Mobile Management Entity
  NAS Non-Access Stratum
  NB-IoT NarrowBand Internet of Things
  PGW Packet Data Network Gateway
  RACH Random Access Procedure
  RAN Radio Access Network
  RF Radio Frequency
  RRC Radio Resource Control
  S1AP S1 Application Protocol
  SGID Service Group ID
  SGTS Service Group To Services
  SGW Serving Gateway
  SID Service ID
  SIM Subscriber Identity Module
  UE User Equipment
  VoIP Voice Over Internet Protocol
  VoLTE Voice Over Long Term Evolution Those skilled in the art will recognize improvements and modifications to the embodiments of the present disclosure. All such improvements and modifications are considered within the scope of the concepts disclosed herein.

What is claimed is:

1. A method comprising:
  determining, by a user equipment (UE), that a first cellular service of a plurality of cellular services is desired;
  accessing, by the UE, service group information that includes service group to cell information and service group to service information, wherein:
    the service group to cell information correlates a plurality of service groups to a plurality of cells and identifies one or more cells that support each service group; and
    the service group to service information correlates the plurality of cellular services to the plurality of service groups and identifies one or more service groups that support each cellular service; and
  initiating a first connection with a first cell of the plurality of cells that can provide the first cellular service based at least in part on the service group information.

2. The method of claim 1 further comprising receiving, from a cell of the plurality of cells, a paging message, the paging message including at least one service group identifier (ID) that identifies a service group of the plurality of service groups.

3. The method of claim 1 wherein the service group information identifies the first cell as being associated with the plurality of service groups.

4. The method of claim 1 wherein accessing the service group information further comprises receiving the service group to cell information from at least one cell of the plurality of cells.

5. The method of claim 1 further comprising:
  determining, by the UE, that a second cellular service of the plurality of cellular services is desired;
  sending, to the first cell, a service request for the second cellular service;
  receiving, from the first cell, a list that identifies the one or more service groups and a request to generate a measurement report;
  generating a measurement report that identifies characteristics of signals between the UE and the one or more cells associated with the one or more service groups identified in the list; and
  sending the measurement report to the first cell.

6. The method of claim 1 wherein determining that the first cellular service of the plurality of cellular services is desired further comprises determining that the first cellular service of the plurality of cellular services is desired based on a request for the first cellular service from a process executing at an application layer of the UE.

7. The method of claim 1 wherein the first cellular service is one of a Voice Over Long Term Evolution (VoLTE) cellular service, an Internet Protocol Multimedia Subsystem (IMS) video cellular service, a Voice Over Internet Protocol (VoIP) best effort cellular service, and a video best effort cellular service.

8. The method of claim 1 further comprising:
  determining, by the UE, radio frequency (RF) signal strength between the UE and each cell that can provide the first cellular service, wherein initiating the first connection with the first cell of the plurality of cells is further based on the determined RF signal strength.

9. A user equipment (UE) comprising:
  a network interface; and
  a processor device coupled to the network interface and configured to:
    determine that a first cellular service of a plurality of cellular services is desired;

access service group information that includes service group to cell information and service group to service information, wherein:
the service group to cell information correlates a plurality of service groups to a plurality of cells and identifies one or more cells that support each service group; and
the service group to service information correlates the plurality of cellular services to the plurality of service groups and identifies one or more service groups that support each cellular service; and
initiate a first connection with a first cell of the plurality of cells that can provide the first cellular service based at least in part on the service group information.

10. A method comprising:
broadcasting, by a first cell, supported service group information that identifies at least one service group supported by the first cell, and a cell identifier that identifies the first cell;
receiving, from a user equipment (UE), a request to connect to the first cell, the request including a service group identifier of a service group supported by the first cell, and a service identifier that identifies a first service provided by the first cell;
connecting to the UE;
receiving, from the UE, a request for a second service;
determining, by the first cell, at least one service group associated with the second service;
sending, to the UE, a measurement request that includes a service group ID that identifies the at least one service group associated with the second service;
receiving, from the UE, a measurement report that identifies a strength of radio frequency signals between the UE and at least one second cell that supports the at least one service group associated with the second service; and
sending, to the UE, a message directing the UE to connect to the at least one second cell.

11. A first cell comprising:
a network interface; and
a processor device coupled to the network interface and configured to:
broadcast supported service group information that identifies at least one service group supported by the first cell, and a cell identifier (ID) that identifies the first cell;
receive, from a user equipment (UE), a request to connect to the first cell, the request including a service group ID associated with the first cell, and a service ID that identifies a service provided by the first cell;
connect to the UE;
receive, from the UE, a request for a second service;
determine at least one service group associated with the second service;
send, to the UE, a measurement request that includes a service group ID that identifies the at least one service group associated with the second service;
receive, from the UE, a measurement report that identifies a strength of radio frequency signals between the UE and at least one second cell that supports the at least one service group associated with the second service; and
send, to the UE, a message directing the UE to connect to the at least one second cell.

12. The first cell of claim 11 wherein the processor device is further configured to:
receive, by the first cell, a first paging message that includes at least one service group ID that identifies at least one service group, the first paging message directed to the UE;
send, by the first cell to the UE, a second paging message that includes the at least one service group ID; and
receive, from the UE, the request to connect to the first cell.

13. The first cell of claim 11 wherein the processor device is further configured to:
send, to a second cell, an X2AP SeNB Addition Request message that includes a service ID that identifies a service, and a service group ID list that identifies at least one service group.

14. The first cell of claim 11 wherein the processor device is further configured to:
send, to a second cell, an X2AP SeNB Modification Request message that includes a service ID that identifies a service, and a service group ID list that identifies at least one service group.

15. The first cell of claim 11 wherein the processor device is further configured to:
send, to a target second cell, an X2AP SeNB Addition Request message that includes a service ID that identifies a service, and a service group ID list that identifies at least one service group.

16. The first cell of claim 11 wherein the processor device is further configured to:
send, to a Mobile Management Entity (MME) an S1AP E-Service Setup/Modify/E-RAB Setup/Modify message that includes a service ID that identifies a service, and a service group ID list that identifies at least one service group.

17. The first cell of claim 11 wherein the processor device is further configured to:
receive, from the MME an S1AP E-Service Setup/Modify/ERAB Setup/Modify message that includes a service ID that identifies a service, and a service group ID that identifies a service group.

18. The first cell of claim 11 wherein the processor device is further configured to:
receive, from a target MME, an S1AP Service Request message that includes a service ID that identifies a service, and a service group ID that identifies a service group.

19. The first cell of claim 11 wherein the processor device is further configured to:
receive, from a Mobile Management Entity (MME), an S1AP Service Command message that includes a service ID that identifies a service, and a service group ID that identifies a service group.

* * * * *